(12) United States Patent
Kimura

(10) Patent No.: US 6,606,979 B2
(45) Date of Patent: Aug. 19, 2003

(54) COMBUSTION CONTROL SYSTEM FOR DIESEL ENGINE

(75) Inventor: Shuji Kimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/933,681

(22) Filed: Aug. 22, 2001

(65) Prior Publication Data

US 2002/0011240 A1 Jan. 31, 2002

Related U.S. Application Data

(62) Division of application No. 09/163,355, filed on Sep. 30, 1998, now Pat. No. 6,283,096.

(30) Foreign Application Priority Data

Sep. 30, 1997 (JP) .............................................. 9-266358

(51) Int. Cl.[7] .............................................. F02M 37/04
(52) U.S. Cl. ...................................... 123/500; 123/305
(58) Field of Search ................................. 123/501, 305, 123/357, 500, 502, 496, 295, 568.11

(56) References Cited

U.S. PATENT DOCUMENTS

| | | | |
|---|---|---|---|
| 4,397,285 A | 8/1983 | O'Neill | 123/502 |
| 4,503,830 A * | 3/1985 | Nakamura et al. | 123/501 |
| 4,572,119 A * | 2/1986 | Ikeda | 123/145 A |
| 4,624,229 A * | 11/1986 | Matekunas | 123/425 |
| 4,671,236 A | 6/1987 | Matsumura et al. | 123/357 |
| 4,722,310 A * | 2/1988 | Igashira et al. | 123/300 |
| 4,763,630 A | 8/1988 | Nagase et al. | 123/501 |
| 4,883,032 A * | 11/1989 | Hunter et al. | 123/256 |
| 5,522,359 A | 6/1996 | Collin | 123/305 |
| 5,577,476 A * | 11/1996 | Iyoda | 123/425 |
| 5,626,115 A * | 5/1997 | Kawaguchi | 123/305 |
| 5,682,856 A * | 11/1997 | Tomisawa et al. | 123/425 |
| 5,692,464 A | 12/1997 | Kimura | 123/90.15 |
| 5,743,243 A * | 4/1998 | Yanagihara | 123/305 |
| 5,778,857 A * | 7/1998 | Nakamura et al. | 123/406.37 |
| 5,823,168 A | 10/1998 | Otoh et al. | 123/496 |
| 6,062,185 A * | 5/2000 | Chiu et al. | 123/145 A |

FOREIGN PATENT DOCUMENTS

| | | |
|---|---|---|
| DE | 43 33 424 | 4/1994 |
| DE | 195 34 770 | 3/1996 |
| EP | 0 641 926 | 3/1995 |
| JP | 8-086251 | 4/1996 |
| JP | 8-254134 | 10/1996 |

OTHER PUBLICATIONS

Ito et al., "Injection Rate Shaping Technology with Common Rail Fuel System (ECD–U2)", The 13th Internal Combustion Engine Symposium Lecture Papers, (1996), pp. 73–77.

* cited by examiner

Primary Examiner—Carl S. Miller
(74) Attorney, Agent, or Firm—Foley & Lardner

(57) ABSTRACT

A combustion control system for a diesel engine provided with a fuel injection system and a sensor for detecting an ignition timing. The combustion control system comprises a control unit which is configured to control the ignition timing to be restored to a target value when the ignition timing shifts from the target value owing to circumferential factors such as cetane number of fuel. Preferably, the ignition timing is controlled to generally coincide with or be retarded relative to a fuel injection termination timing. This regulates an ignition delay period to be longer than a fuel injection period in a predetermined engine operating region, thereby effectively accomplishing so-called low temperature premix combustion.

6 Claims, 11 Drawing Sheets

IGNITION TIMING TARGET VALUE

COMBUSTION CONTROL SYSTEM FOR DIESEL ENGINE

This Application is a Divisional of application Ser. No. 09/163,355, filed on Sep. 30, 1998, now U.S. Pat. No. 6,283,096.

The contents of Japanese Patent Application No. 9-266358, with a filing date of Sep. 30, 1997 in Japan, are hereby incorporated by reference.

BACKGROUND OF THE INVENTION

1. Field of the Invention

This invention relates to improvements in a combustion control system for a diesel engine, and more particularly to the combustion control system for effecting a low temperature premix combustion in a combustion chamber of the engine so as to improve exhaust emission performance and combustion noise performance of the engine.

2. Description of the Prior Art

Hitherto a variety of techniques for improving exhaust gas performance and combustion noise performance of a diesel engine has been proposed and put into practical use. One of them is disclosed in Japanese Patent Provisional Publication No. 8-86251 and configured as follows: A fuel injection timing is retarded to a timing after top dead center on compression stroke thereby prolonging a so-called ignition delay period of between a fuel injection initiation timing and an ignition timing of injected fuel. During this prolonged ignition delay period, a pre-mixture of air and fuel is formed in the combustion chamber by lowering an oxygen concentration owing to exhaust gas recirculation and by controlling gas flow in the combustion chamber, thus accomplishing a so-called low temperature premix combustion.

SUMMARY OF THE INVENTION

Now, the low temperature premix combustion aims at the fact that fuel is dispersed around oxygen as much as possible before initiation of ignition. In this regard, the latest experiments have revealed that the most important condition for effectively realizing the low temperature premix combustion is to terminate fuel injection during the ignition delay period (i.e., the ignition delay period is longer than a fuel injection period for which fuel is being injected), in addition to promoted dispersion of fuel under a gas flow control. Accordingly, if the ignition delay period is changed owing to difference in circumferential factors such as difference in cetane number of fuel so as to become shorter than the fuel injection period, the low temperature premix combustion cannot be accomplished and therefore exhaust gas purification performance inherent in the low temperature premix combustion cannot be obtained. For example, in case that the cetane number of fuel is high so that the ignition delay period is shorter than the fuel injection period, the low temperature premix combustion cannot be realized and therefore diffusive combustion is mainly made in the combustion stroke thereby increasing smoke in exhaust gas.

In case that the cetane number of fuel is low, the ignition delay period is prolonged and therefore such a low cetane number is preferable for the low temperature premix combustion. However, if the ignition timing of fuel is further retarded owing to use of low cetane number fuel upon having been originally retarded in the low temperature premix combustion, fuel economy is degraded owing to lowering in combustion pressure in a high EGR rate operating range while causing misfire thereby increasing unburned fuel emission. Additionally, this increases combustion noise in a low EGR rate operating range of the diesel engine.

An object of the present invention is to provide an improved combustion control system for a diesel engine, which can overcome drawbacks encountered in conventional combustion control systems for diesel engines.

Another object of the present invention is to provide an improved combustion control system for a diesel engine, which can effectively prevent performances of smoke, fuel economy and combustion noise from being degraded under the influence of circumferential factors such as cetane number of fuel.

A further object of the present invention is to provide an improved combustion control system for a diesel engine, by which an ignition delay period is controlled to be longer than a fuel injection period thereby effectively accomplishing low temperature premix combustion.

A still further object of the present invention is to provide an improved combustion control system for a diesel engine, which can accomplish such a control as to cause the relationship between an ignition delay period and a fuel injection period to fall into a predetermined state when an ignition timing shifts from a target value.

A first aspect of the present invention resides in a combustion control system for a diesel engine, comprising a section for changing an ignition timing. A section is provided for changing a fuel injection period. A section is provided for detecting the ignition timing. Additionally, a section is provided for controlling a relationship between an ignition delay period and the fuel injection period to fall into a predetermined state when the detected ignition timing shifts from a target value. Accordingly, even if the ignition timing is changed owing to circumferential factors such as cetane number of fuel, smoke in exhaust gas, fuel consumption and combustion noise can be effectively prevented from being degraded.

A second aspect of the present invention resides, as shown in FIG. 14, in a combustion control system for a diesel engine, comprising a section 81 for detecting an ignition timing. Additionally, a section 82 is provided for controlling the detected ignition timing to generally coincide with or be retarded relative to a fuel injection termination timing in a predetermined engine operating region. Accordingly, the ignition timing is necessarily controlled to generally coincide with or retarded relative to the fuel injection termination timing. As result, the ignition delay period is controlled to be longer than the fuel injection period, thereby effectively accomplishing the low temperature premix combustion. This can effectively prevent smoke in exhaust gas and combustion noise from increasing even if circumferential factors such as cetane number of fuel are changed.

A third aspect of the present invention resides, as shown in FIG. 15, in a combustion control system for a diesel engine, comprising a section 81 for detecting an ignition timing. A section 91 is provided for judging that the detected ignition timing is retarded relative to a target value. A section 92 is provided for controlling the detected ignition timing so as to be restored to the target value when the detected ignition timing is retarded relative to the target value. Accordingly, the relationship between the ignition delay period and the fuel injection period can be restored to the target state even in case that the ignition timing is changed owing to low cetane number fuel or the like in a non-low temperature premix combustion region, thereby preventing combustion noise from increasing while suppressing smoke in exhaust gas.

A fourth aspect of the present invention resides, as shown in FIG. 16, in a combustion control system for diesel engine, comprising a section 81 for detecting an ignition timing. A section 91 is provided for judging that the detected ignition timing is retarded relative to a target value. Additionally, a section 101 is provided for controlling an oxygen concentration in a combustion chamber so as to be decreased to a predetermined value when the detected ignition timing is retarded relative to the target value. Accordingly, a control point can be shifted into a region equivalent to that contains a target value even in case that it is difficult that the relationship between the fuel injection period and the ignition delay period cannot be restored to the target state in the non-low temperature premix combustion region, owing to an excessive prolongation of the ignition delay period, for example, due to low cetane number fuel. This effectively achieves suppressing combustion noise of the engine.

A fifth aspect of the present invention resides, as shown in FIG. 17, in a combustion control system for a diesel engine, comprising a section 81 for detecting an ignition timing. A section 111 is provided for judging that first and second conditions are established in a predetermined engine operating region. The first condition is established when the detected ignition timing is advanced relative to a fuel injection termination timing. The second condition is established when it is difficult to control the detected ignition timing to generally coincide with or retarded relative to the fuel injection termination timing. Additionally, a section 112 is provided for controlling an amount of oxygen in a combustion chamber of the engine to increase when the first and second conditions are established. Accordingly, the oxygen amount in the combustion chamber can be increased in case that it is difficult to control the ignition timing to generally coincide with or retarded relative to the fuel injection termination timing under a condition where the actual ignition timing is advanced relative to the fuel injection termination timing. This can effectively reduce smoke in exhaust gas.

DETAILED DESCRIPTION OF THE INVENTION

Figure 1:
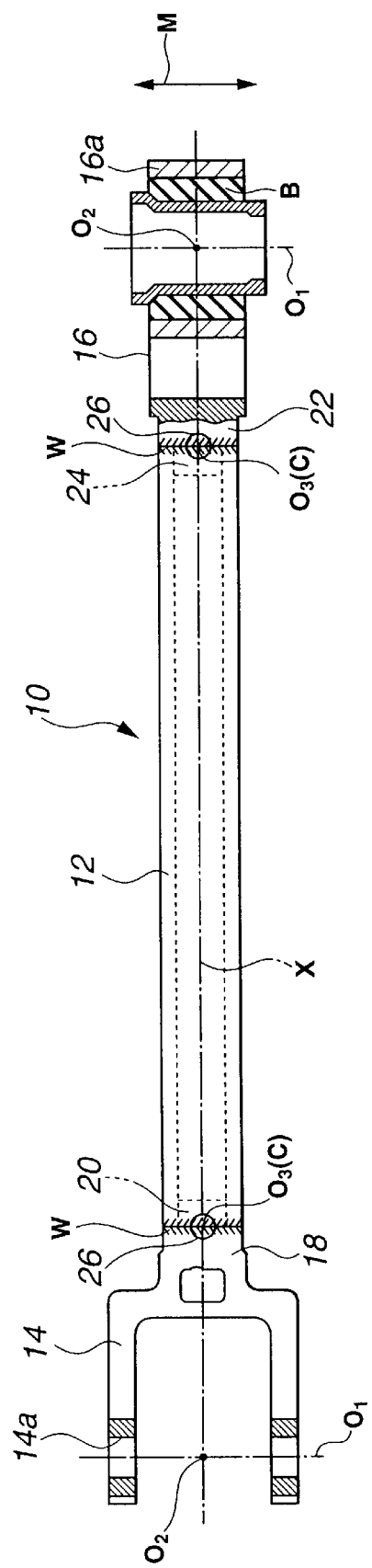
FIG. 1 is a schematic illustration of a first embodiment of a combustion control system according to the present invention, in combination with a diesel engine.

Referring now to FIG. 1, a first embodiment of a combustion control system for a diesel engine D, according to the present invention is illustrated by the reference character S. The diesel engine D includes an engine main body 1 having a plurality of cylinders (not shown) in which a plurality of combustion chambers (not shown) are respectively formed. The diesel engine D is arranged to accomplish so-called low temperature premix combustion in each combustion chamber under predetermined engine operating conditions. Such diesel engine D itself is known as disclosed in Japanese Patent Provisional Publication No. 8-86251.

In such a diesel engine D, generation of NOx (nitrogen oxides) in each combustion chamber largely depends on combustion temperature (or a temperature at combustion in the combustion chamber), so that lowering the combustion temperature is effective for lowering an emission level of NOx. During the low temperature premix combustion, combustion at a low combustion temperature is realized by lowering an oxygen concentration in the combustion chamber under the action of EGR (Exhaust Gas Recirculation) which is accomplished by an EGR system E. The EGR system E includes an EGR passage 4 which connects an exhaust gas passageway 2 and an intake air passageway 3. A diaphragm-type EGR valve 6 is disposed in the EGR passage 4 and arranged to control exhaust gas (EGR gas) passing through the EGR passage 4 in response to a vacuum controlled by a vacuum control valve 5.

Figure 3:
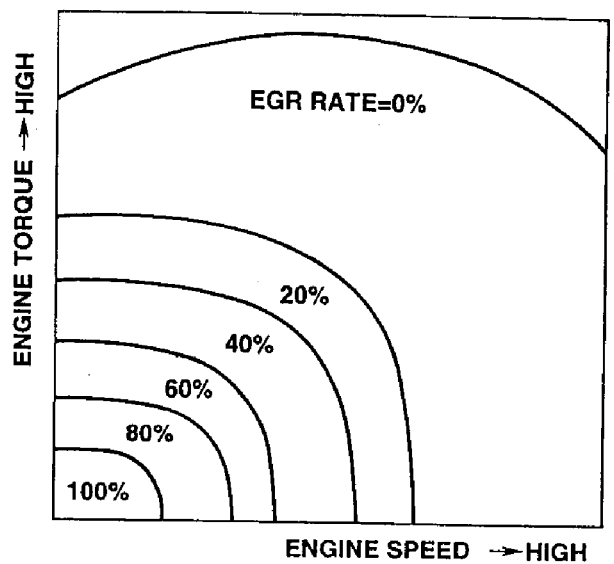

The vacuum control valve 5 is driven in response to a duty control signal from a control unit 41, so that a predetermined EGR rate can be obtained in accordance with an engine operating condition of the diesel engine D. The EGR rate (%) is represented by an equation of [(EGR gas quantity / fresh air quantity)×100] where the EGR gas quantity is a quantity of exhaust gas (EGR gas) recirculated back to the intake air passageway 3 from the exhaust gas passageway 2; and the fresh air quantity is a quantity of intake air passing through the intake air passage 3 to be supplied to the combustion chambers of the engine main body 1. In the diesel engine, as shown in FIG. 3, the EGR rate is, for example, set at 100% (the maximum value) in a low engine speed and low engine load operating range, in which the EGR rate is lowered as the engine speed and the engine load increase. If a large amount of EGR gas is recirculated back to the engine in a high engine load operating range, the temperature of intake air rises thereby degrading a NOx reduction effect due to exhaust gas recirculation (EGR); and a so-called ignition delay period for injected fuel is shortened thereby, for example, making it impossible to realize so-called premix combustion. The ignition delay period is a period between a fuel injection initiation timing and an ignition timing of the injected fuel. In view of this, the EGR rate is lowered stepwise with the increased engine load and engine speed.

A cooling device 7 for EGR gas is disposed in the EGR passage 4 and includes a water jacket 8 disposed around a part of the EGR passage 4. A part of engine coolant (cooling water) is flown through the water jacket 8. The water jacket 8 is provided with an inlet pipe 7a through which engine coolant is flown into the water jacket 8 from the engine main body 1, and an outlet pipe 7b through which engine coolant is discharged back to the engine main body 1. A flow control valve 9 is disposed between the engine main body 1 and the inlet pipe 7a of the water jacket 8 so as to control an amount of engine coolant circulating through the water jacket 8 in response to a command from the control unit 41. The degree of cooling for EGR gas increases as the amount of engine coolant circulating through the water jacket 8 increases.

A swirl valve (not shown) is movably disposed in the intake air passageway 3 in the vicinity of an intake port for each combustion chamber. The swirl valve is formed with a cutout through which intake air can flow. When this swirl valve is closed in the low engine speed and low load operating range in response to a command from the control unit 41, the flow speed of intake air sucked into the combustion chamber is increased so that swirl is generated in each combustion chamber of the engine main body 1. The combustion chamber is of the large diameter toroidal type wherein a piston has a generally cylindrical piston cavity at its piston crown, though not shown. The piston cavity is not narrowed at its inlet or top section and formed at its bottom with a conical section which are coaxial with the piston cavity, so that no resistance is given to swirl flowing in the piston cavity from the outside of the piston cavity upon making its turning at the latter period of compression stroke of the piston while effectively mixing air and fuel. By virtue of the fact that the inlet section of the piston cavity is not narrowed, swirl generated under the action of the swirl valve and the like is diffused from the inside of the piston cavity to the outside of the piston cavity as the piston is descending on combustion stroke of the piston, so that swirl can be maintained also outside of the piston cavity.

The engine D is provided with a fuel injection system 10 of a so-called common rail type. Such a common rail type fuel injection system 10 is also known as disclosed in "The 13th Internal Combustion Engine Symposium lecture papers (pages 73 to 77). The common rail type fuel injection system 10 will be discussed with reference to FIG. 2. The fuel injection system 10 includes a plurality of fuel injection nozzles 17 which are respectively for the cylinders (or the combustion chambers) formed in the engine main body 1. A supply pump 14 is provided to pressurize fuel supplied through a fuel supply passage 12 from a fuel tank 11. The fuel pressurized by the supply pump 14 is once accumulated in a pressure accumulator chamber (common-rail) 16 and thereafter is distributed into the fuel injection nozzles 17 so that a high pressure fuel is fed to each fuel injection nozzle 17. Each fuel injection nozzle 17 includes a needle valve 18 around which a nozzle chamber 19 is formed. A fuel supply passage 20 is formed to be in communication with the nozzle chamber 19. A retainer 21 is disposed between the needle valve 18 and a hydraulic piston 22. A return spring 23 is disposed around the retainer 21 to bias the needle valve 18 in a direction to cause the needle valve 18 to close in FIG. 2. A fuel supply passage 24 is formed to supply fuel onto the hydraulic piston 22. A three-way valve (electromagnetic valve) 25 is disposed in the fuel supply passage 24. The fuel supply passages 20, 24 are connected to the pressure accumulator chamber 16.

The three-way valve 25 is configured as follows: When the three-way valve 25 takes its OFF position where communication is established between ports A and B while communication is blocked between the port B and a port C, the fuel supply passages 20, 24 are brought into communication with each other so that high pressure fuel from the pressure accumulator chamber 16 is introduced onto the top surface of the hydraulic piston 22 and into the nozzle chamber 19. At this time, the needle valve 18 is in its seated state so that no fuel is injected through a fuel injection hole formed at the tip end of the fuel injection nozzle 17, because the piston has a pressure receiving surface larger than that of the needle valve 18. When the three-way valve 25 takes its ON position where communication is blocked between the ports A and B while communication is established between the ports B and C, high pressure fuel introduced onto the top surface of the hydraulic piston 22 is returned to the fuel tank 11 through a fuel return passage 28 so that a fuel pressure applied to the hydraulic piston 22 is lowered. As a result, the needle valve ascends so that fuel is injected through the fuel injection hole formed at the tip end of the fuel injection nozzle 17.

Figure 2:
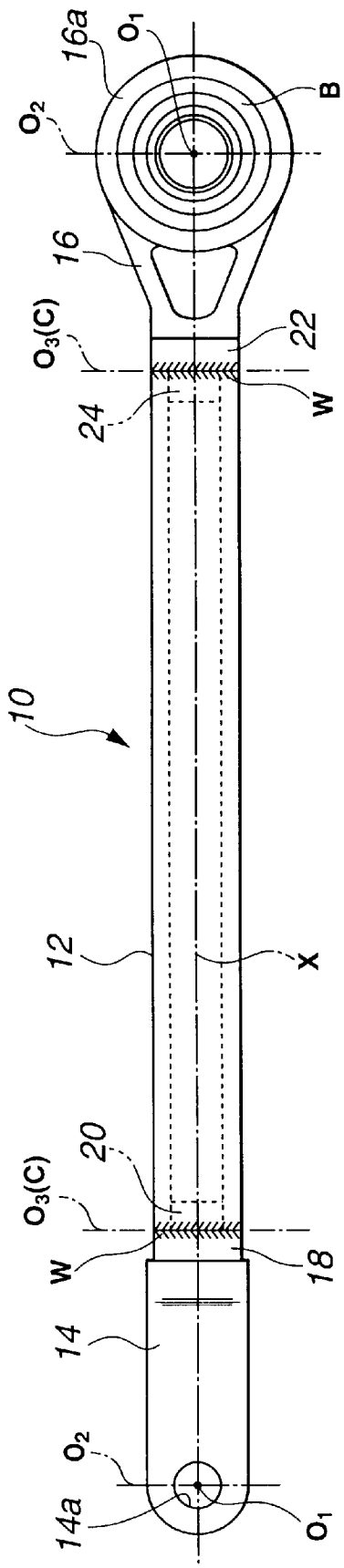
FIG. 2 is a schematic illustration of a common-rail type fuel injection system used in the combustion control system of FIG. 1.
Figure 3A:
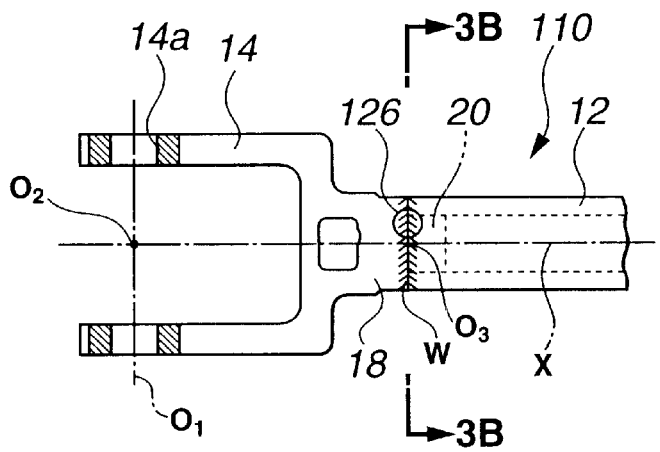
FIG. 3 is a graph showing the basic characteristics of EGR rate in terms of engine torque and engine speed, used in the combustion control system of FIG. 1.
Figure 3B:
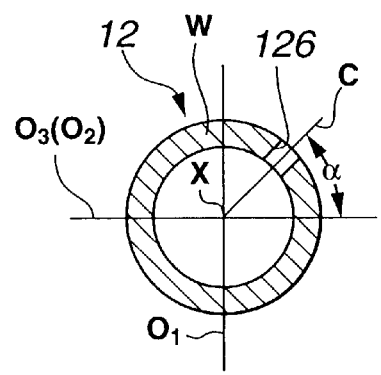
Figure 4A:
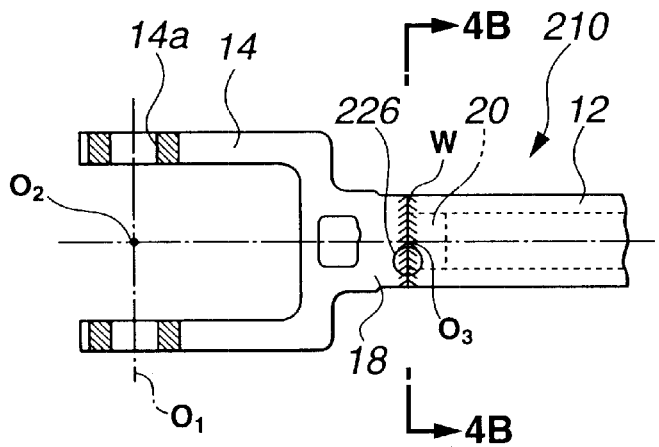
FIG. 4 is a graph showing the basic characteristics of a fuel injection (initiation) timing in terms of engine torque and engine speed, used in the combustion control system of FIG. 1.
Figure 4B:
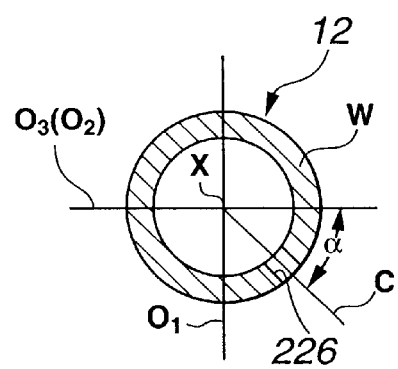

When the three-way valve 25 again takes its OFF position, high pressure fuel from the pressure accumulator chamber 16 is introduced onto the hydraulic piston 22 thereby completing fuel injection from the fuel injection nozzle 17. In other words, the change-over timing of from the OFF position to the ON position of the three-way valve 25 corresponds to a fuel injection initiation timing at which fuel injection is initiated, while the time duration of the ON position of the three-way valve 25 corresponds to a fuel injection quantity (or a quantity of fuel to be injected) so that the fuel injection quantity increases as the time duration of the ON position becomes long if the pressure in the pressure accumulator chamber is the same. In FIG. 2, the reference numerals 26 and 27 designate a check valve and an orifice, respectively.

The fuel injection system 10 further includes a pressure regulator valve 31 disposed in a fuel return passage 13 through which fuel discharged from the supply pump 14 is returnable to the fuel tank 11 for the purpose of regulating the pressure within the pressure accumulator chamber 16. The pressure regulator valve 31 is adapted to allow or block flow of fuel through the fuel return passage 13 thereby controlling the quantity of fuel to be discharged to the pressure accumulator chamber 16 thus to regulate the pressure within the pressure regulator chamber 16. It will be understood that a fuel injection rate (or a quantity of fuel to be injected per unit time) changes in accordance with the pressure of fuel within the pressure accumulator chamber 16, in which the fuel injection rate increases as the fuel pressure within the pressure accumulator chamber 16 increases.

The control unit 41 is electrically connected to the three-way valve 25 of the fuel injection nozzle 17 and to the pressure regulator valve 31, and electrically connected to an accelerator position sensor 33 for detecting the position of an accelerator pedal, a sensor 34 for detecting an engine speed of the engine and a crank angle of a crankshaft of the engine, a sensor 35 for detecting a cylinder to be controlled, an engine coolant temperature sensor 36 for detecting the temperature of the engine coolant. Accordingly, signals from the sensors 33, 34, 35, 36 are input to the control unit 41. The control unit 41 functions to calculate a target fuel injection quantity (or a quantity of fuel to be injected into the cylinder) and a target pressure within the pressure accumulator chamber 16 in accordance with the engine speed and the accelerator pedal position, and makes such a feedback control through the pressure regulator valve 31 that the pressure within the pressure accumulator chamber 16 detected by a pressure sensor 32 coincides with the target pressure.

Figure 4:
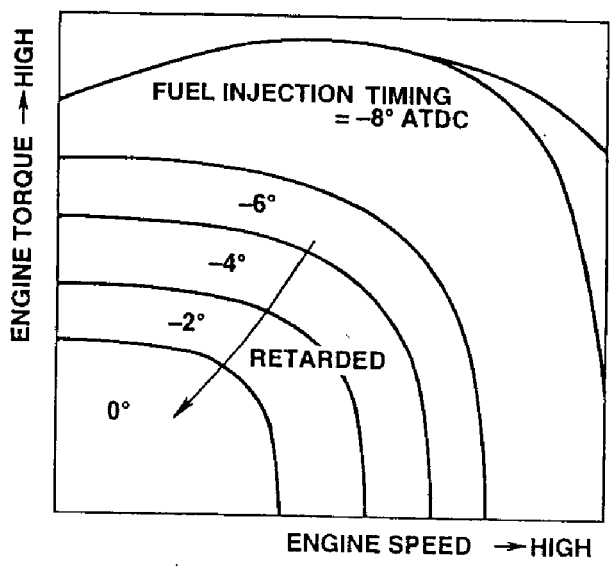
Figure 5:
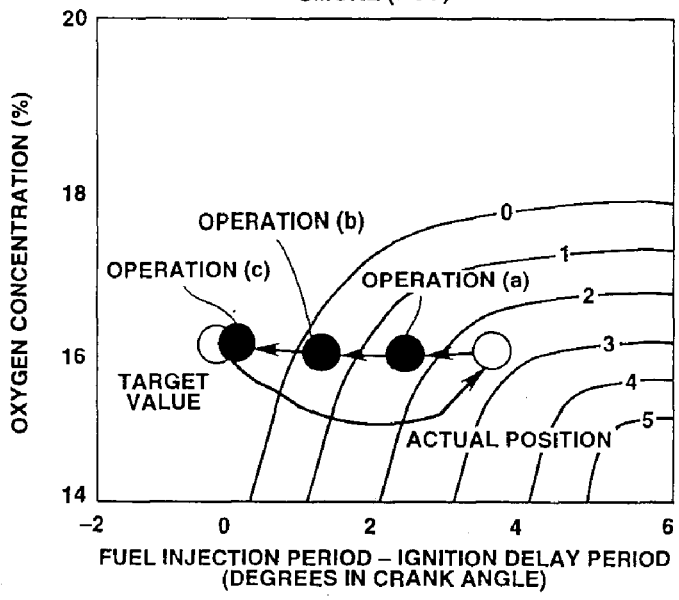
Figure 6:
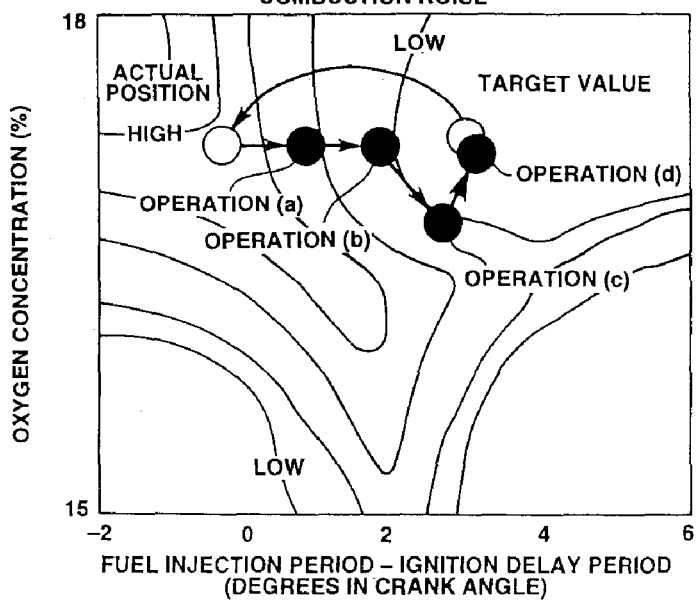
Figure 7:
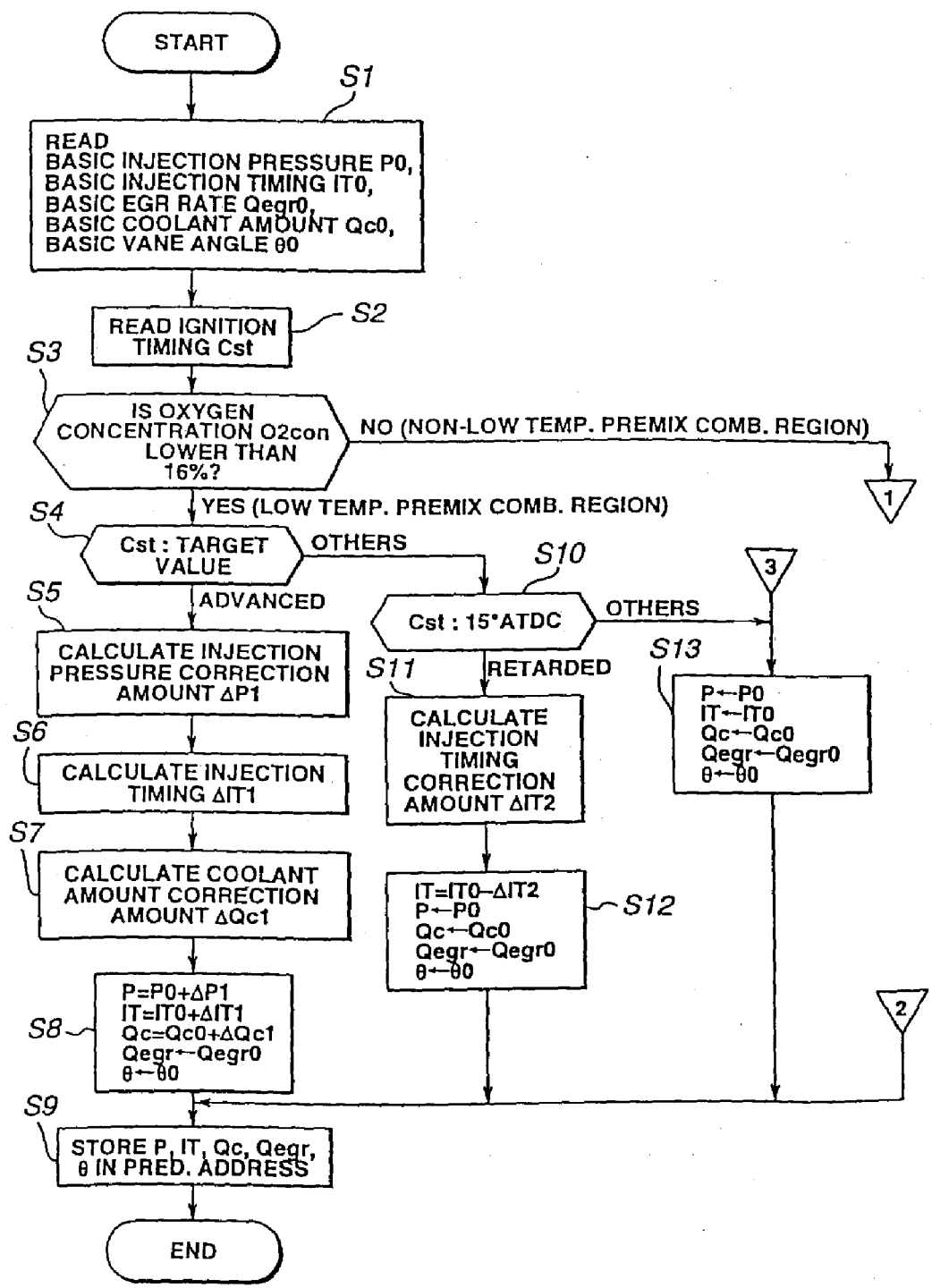
Figure 8:
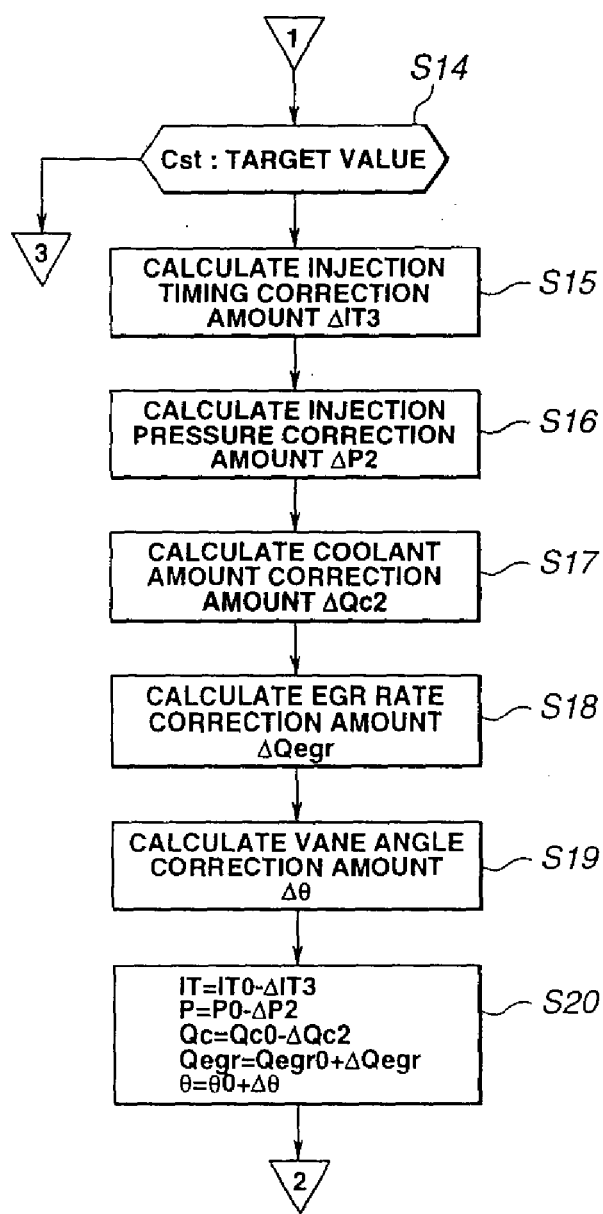
Figure 9:
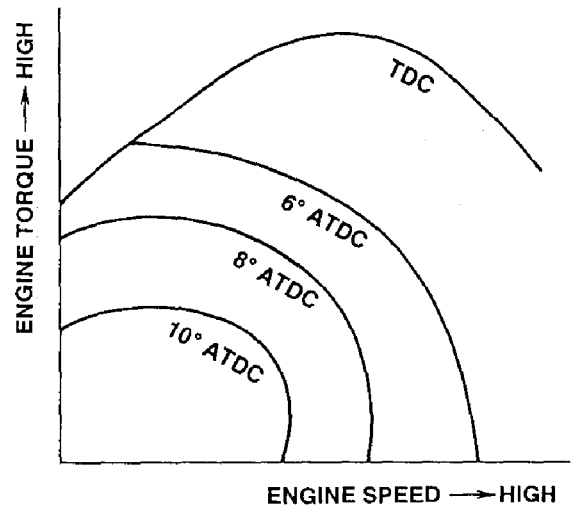
Figure 10:
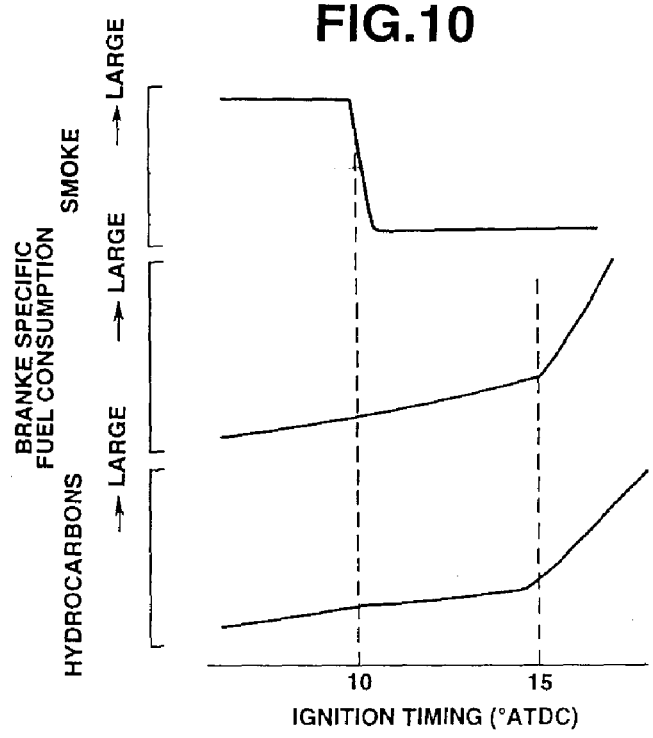
Figure 11A:
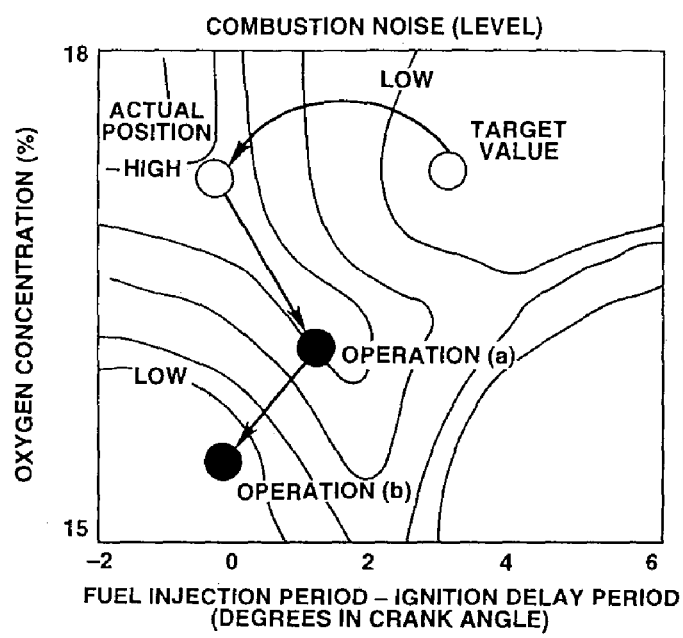
Figure 11B:
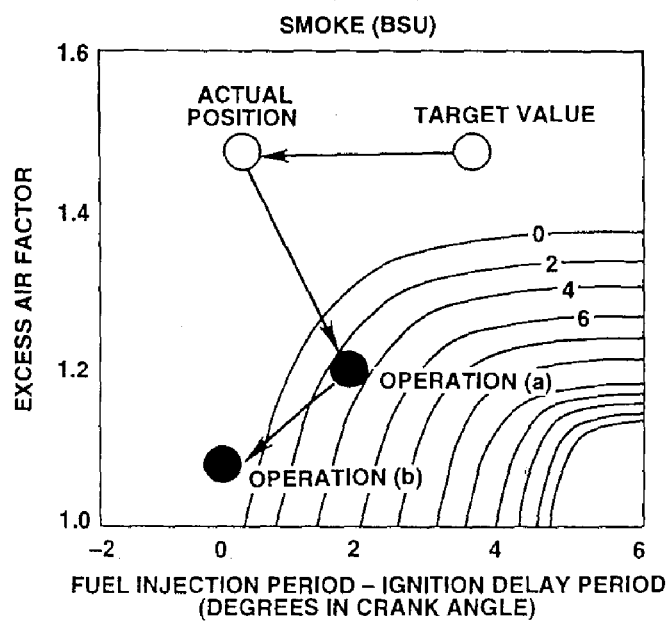
Figure 12:
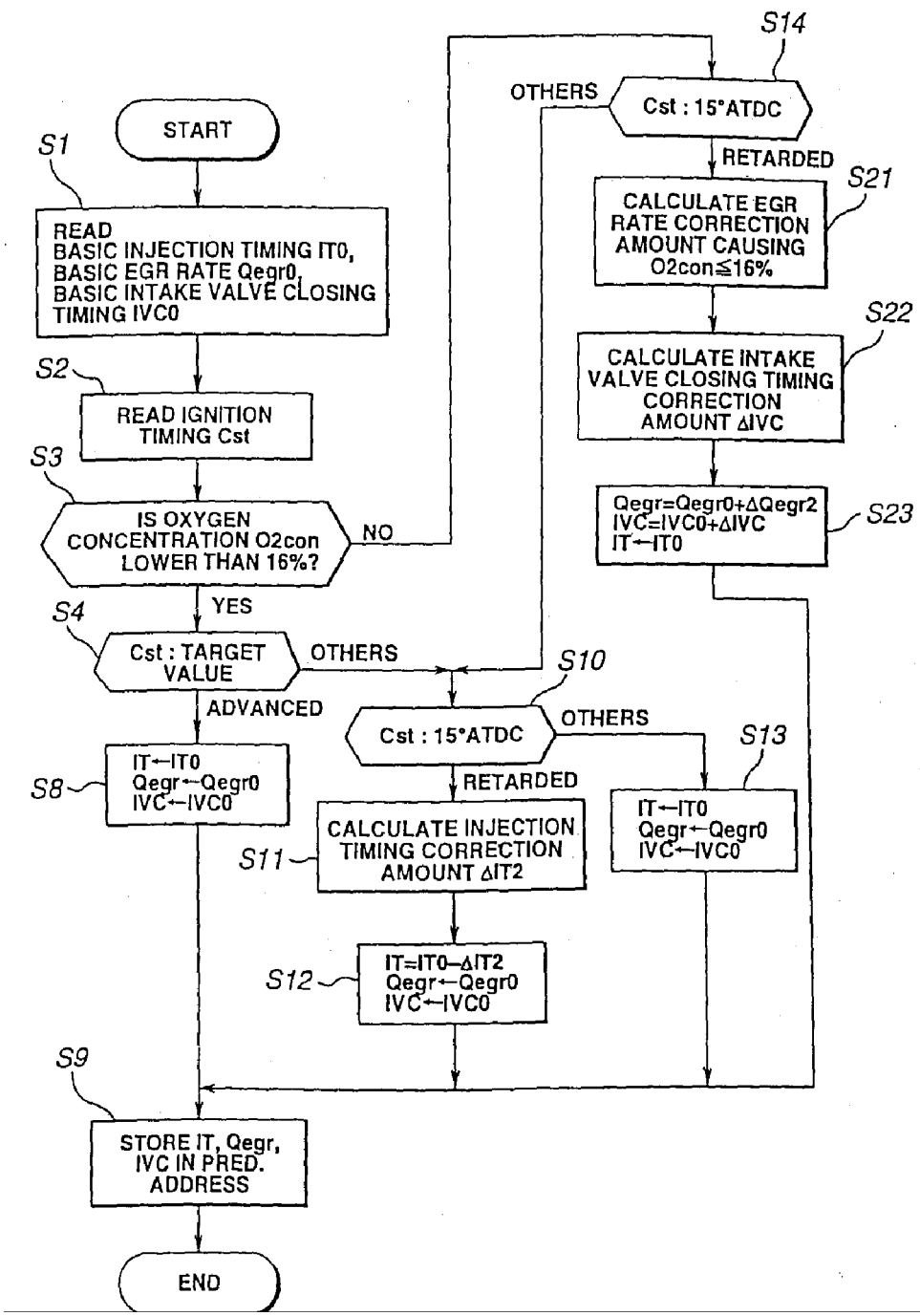
Figure 13:
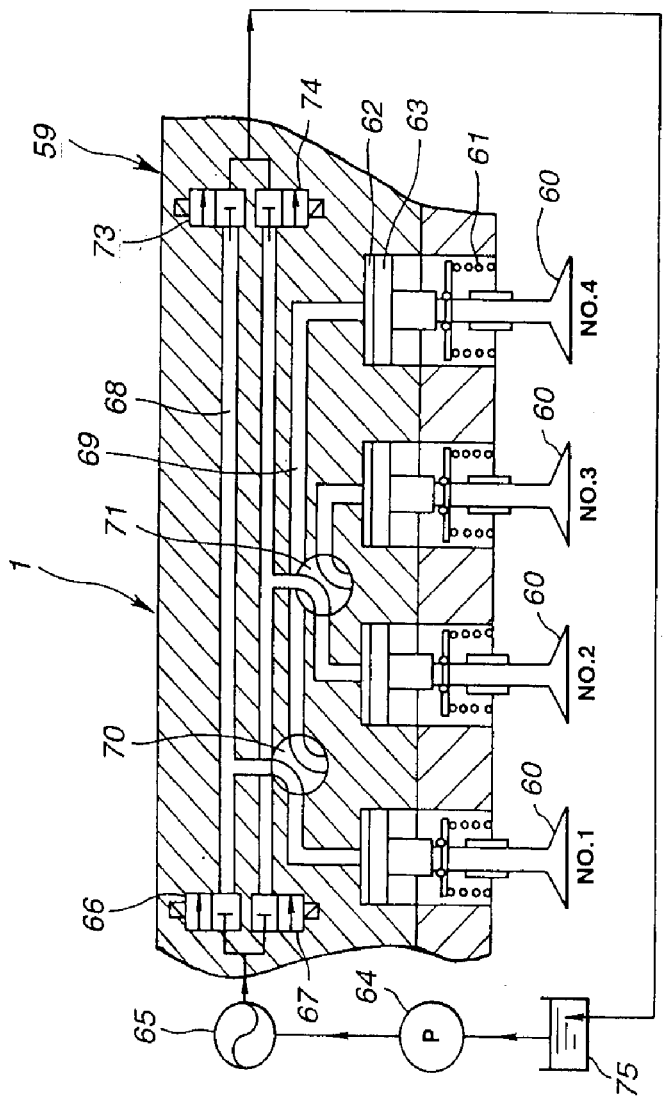
Figure 14:
Figure 15:
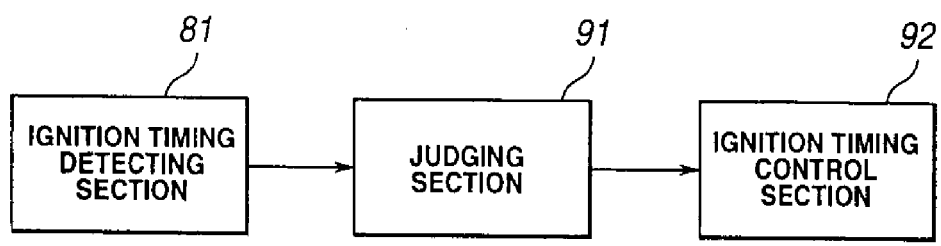
Figure 16:
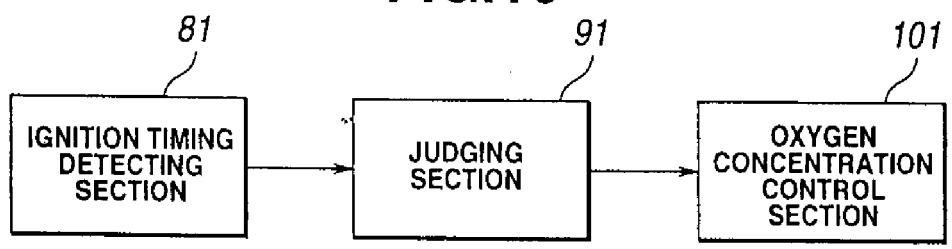
Figure 17:
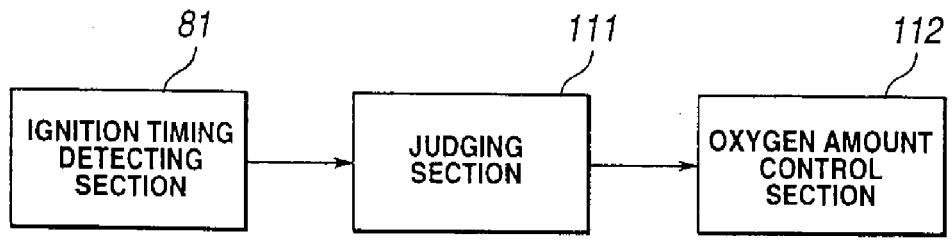

Additionally, the control unit 41 functions to so control the time duration of the ON position of the three-way valve 25 as to correspond to the calculated target fuel injection quantity, and to control the change-over timing of from the OFF position to the ON position of the three-way valve 25 thereby to obtain a predetermined value of the fuel injection initiation timing suitable for the engine operating condition. For example, as shown in FIG. 4, the fuel injection initiation timing (fuel injection timing) is retarded to the top dead center (TDC) of the piston so as to increase the ignition delay period in the low engine speed and low engine operating range in which EGR is made at a high EGR rate. This retardation of the fuel injection initiation timing establishes a low temperature condition within the combustion chamber at a timing where ignition is to be made, while accomplishing a combustion whose main part is the premix combustion, thus suppressing generation of smoke in exhaust gas at a high EGR rate engine operating range. In contrast, as engine speed and engine load increase, the fuel injection initiation timing is advanced. This is because an ignition delay crank angle (obtained by converting the ignition delay (time) period into a crank angle) increases in proportion to engine speed even if the ignition delay (time) period is constant. Thus, the fuel injection initiation timing is advanced to obtain a predetermined ignition timing at a low EGR rate operating condition.

Turning back to FIG. 1, a turbocharger T includes an exhaust gas turbine 52 which is disposed in the exhaust gas passageway 2 downstream of a portion to which the EGR passage 4 is opened. A variable vane 53 is disposed at the scroll inlet of the turbine 52 and adapted to be driven by a step motor 54. It will be understood that a compressor of the turbocharger T is disposed in the intake air passageway 3. Here, the control unit 41 controls the variable vane 53 through the step motor 54 in such a manner that the variable vane 53 takes a first vane angle (or inclined state) in a low engine speed operating range in order to increase the flow speed of exhaust gas to be introduced into the turbine 52 in a low engine speed operating range, and a second vane angle (or fully opened state) in a high engine speed operating range in order to minimize resistance of exhaust gas to be introduced into the turbine 52. This can provide a predetermined supercharged pressure (or pressure generated in the intake passage 3 by the turbocharger T) throughout low to high engine speed operating ranges. Additionally, the variable vane 53 is controlled to take a third vane angle for lowering the supercharged pressure in a predetermined engine operating condition.

Now, the latest experiments have revealed that the most important condition for realizing the low temperature premix combustion is to terminate fuel injection during the ignition delay period (i.e., the ignition delay period is longer than a fuel injection period for which fuel is being injected), in addition to promoted dispersion of fuel under gas flow control. Accordingly, if the ignition delay period is changed owing to difference in circumferential factors such as cetane number of fuel so as to become shorter than the fuel injection period, the low temperature premix combustion cannot be accomplished and therefore exhaust gas purification performance inherent in the low temperature premix combustion cannot be obtained. For example, in case that the cetane number of fuel is high so that the ignition delay period is shorter than the fuel injection period, the low temperature premix combustion cannot be realized and therefore diffusive combustion is mainly made in the combustion stroke thereby increasing smoke in exhaust gas.

In case that the cetane number of fuel is low, the ignition delay period is prolonged and therefore is preferable for the low temperature premix combustion. However, if the ignition timing of fuel is further retarded owing to use of low cetane number fuel upon having been originally retarded in the low temperature premix combustion, fuel consumption is degraded owing to lowering in combustion pressure in a high EGR rate operating range while causing misfire thereby increasing unburned fuel emission. Additionally, this increases combustion noise in a low EGR rate operating condition.

In order to cope with the above problems, according to the first embodiment combustion control system, an actual ignition timing of fuel is detected; and then the detected ignition timing is controlled to coincide with or retarded relative to a fuel injection termination timing at which injection of fuel is terminated in a low temperature premix combustion (engine operating) region where the low temperature premix combustion is carried out.

Here, discussion will be made on a control image in case that the ignition delay period is changed owing to cetane number of fuel, with reference to FIGS. 5 and 6.

Figure 5:
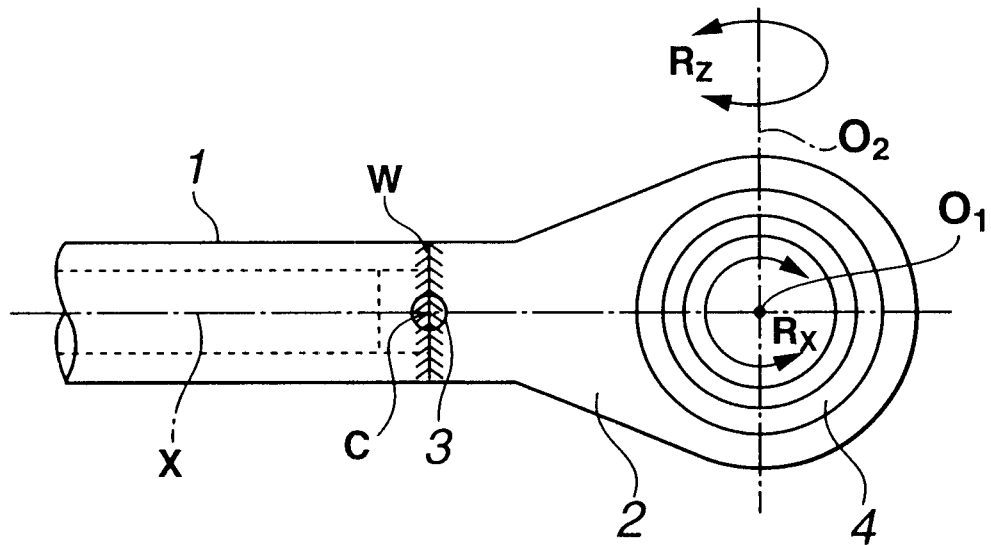
FIG. 5 is a map illustrating a control manner in case that an ignition delay period is shortened owing to high cetane number of fuel in a low temperature premix combustion region, in connection with the combustion control system of FIG. 1.

FIG. 5 shows a condition where fuel has a cetane number higher than that of fuel used in a matching test for obtaining control maps and the like, and therefore a control point shifts from a target value thereby increasing smoke in exhaust gas in the low temperature premix combustion region. This is caused for the following reasons: A difference value (fuel injection period—ignition delay period) on the axis of abscissas is preferable to be zero or minus value in order to accomplish the low temperature premix combustion; however, injection of whole fuel cannot be terminated during the ignition delay period, owing to the high cetane number of fuel (i.e., the difference value takes a plus value). As a result, the rate of diffusive combustion increases. In addition, the fact that the oxygen concentration in the combustion chamber is lowered to 16% under the action of exhaust gas recirculation.

In this case, in order to restore the difference value (the fuel injection period—the ignition delay period) to zero or a minus value (the difference value is restored to the target value or zero in case of FIG. 5), the following three operations are successively carried out:

(a) First, an injection pressure of fuel is increased to shorten the fuel injection period thereby minimizing the difference of the fuel injection period from the ignition delay period;

(b) Secondly, the fuel injection initiation timing is delayed by an amount of the ignition timing advance due to the high cetane number of fuel; and (c) thirdly, an amount of engine coolant flowing through the EGR gas cooling device 7 (or through the flow control valve 9) is increased to lower the temperature of EGR gas, thereby prolonging the ignition delay period.

Thus, by carrying out the operations (a), (b) and (c) in combination, the relationship between the fuel injection period and the ignition delay period can be restored to its target state thereby suppressing an increase in smoke in exhaust gas even in case that the ignition timing is advanced (in crank angle) relative to the fuel injection termination timing owing to the high cetane number of fuel in the low temperature premix combustion region, as shown in FIG. 5.

It will be appreciated that it is not necessary to combine the above all operations (a), (b) and (c), so that only one or two of the above operations (a), (b) and (c) may be carried out if the relationship between the fuel injection period and the ignition delay period can be restored to the target state.

In case of a non-low temperature premix combustion (engine operating) region other than the low temperature premix combustion region, the fuel injection initiation timing and the fuel injection pressure are controlled to meet target values of the ignition timing and the fuel injection quantity.

Next, in case that fuel has a cetane number lower than that of fuel used in the matching test is used, the following two combustion regions are taken into consideration:

(1) Low temperature premix combustion region

In this region, it is preferable to prolong the ignition delay period owing to a low cetane number of fuel. However, there is a limit for prolonging the ignition delay period. If the ignition timing is excessively retarded, fuel consumption is degraded while increasing unburned component emission. Thus, in order to avoid this shortcoming, it is sufficient to advance the fuel injection initiation timing so as to cause the ignition timing to coincide with a target value.

(2) Normal combustion region at high load (Non-low temperature premix combustion region)

Figure 6:
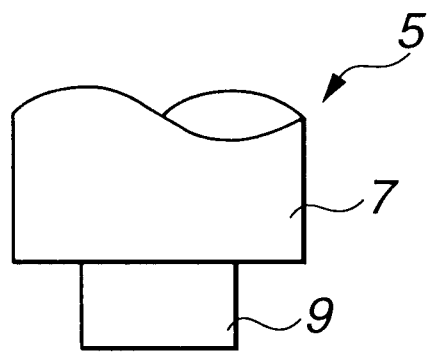
FIG. 6 is a map illustrating a control manner in case that the ignition delay period is prolonged owing to low cetane number of fuel in a non-low temperature premix combustion region, in connection with the combustion control system of FIG. 1.

FIG. 6 shows a condition where the ignition delay period is prolonged owing to a low cetane number of fuel thereby increasing combustion noise in the normal combustion region. This is caused for the following reasons: The premix combustion is mainly accomplished under the action of prolongation of the ignition delay period while the oxygen concentration is higher than that in the low temperature premix combustion region, and therefore immediate combustion occurs.

Accordingly, under such a condition, the following four operations are successively carried out:

(a) First, the fuel injection initiation timing is advanced to shorten the ignition delay period, while lowering the fuel injection pressure to lower the fuel injection rate;

(b) Secondly, the amount of engine coolant flowing through the EGR gas cooling device 7 (or through the flow control valve 9) is decreased to raise the temperature of EGR gas;

(c) Thirdly, the EGR rate is further increased to further raise the temperature of intake air thereby shortening the ignition delay period; and (d) Fourthly, the variable vane of the turbocharger is controlled to increase the turbocharged pressure thereby to maintain the intake air quantity and the oxygen concentration, since an excess air factor (quantity of air supplied/theoretical requirement of air) and the oxygen concentration at target values are decreased with a rise in intake air temperature and an increase in EGR rate under the effects of the above (b) and (c).

Thus, by carrying out the operations (a), (b), (c) and (d) in combination, the relationship between the fuel injection period and the ignition delay period can be restored to the target state thereby preventing combustion noise from increasing even in case that the ignition timing is changed owing to a low cetane number of fuel, as shown in FIG. 6.

Also in this case, it will be appreciated that it is not necessary to combine all the above operations (a), (b), (c) and (d). In this connection, only one of the following operations (A), (B), (C) and (D) may be carried out if the relationship between the fuel injection period and the ignition delay period can be restored to the target state:

(A) Advancing the fuel injection initiation timing (forming part of the above operation (a));

(B) Lowering the fuel injection pressure (forming part of the above operation (a));

(C) Combining the above operations (b) and (d); and (D) Combining the above operations (c) and (d).

Figure 7:
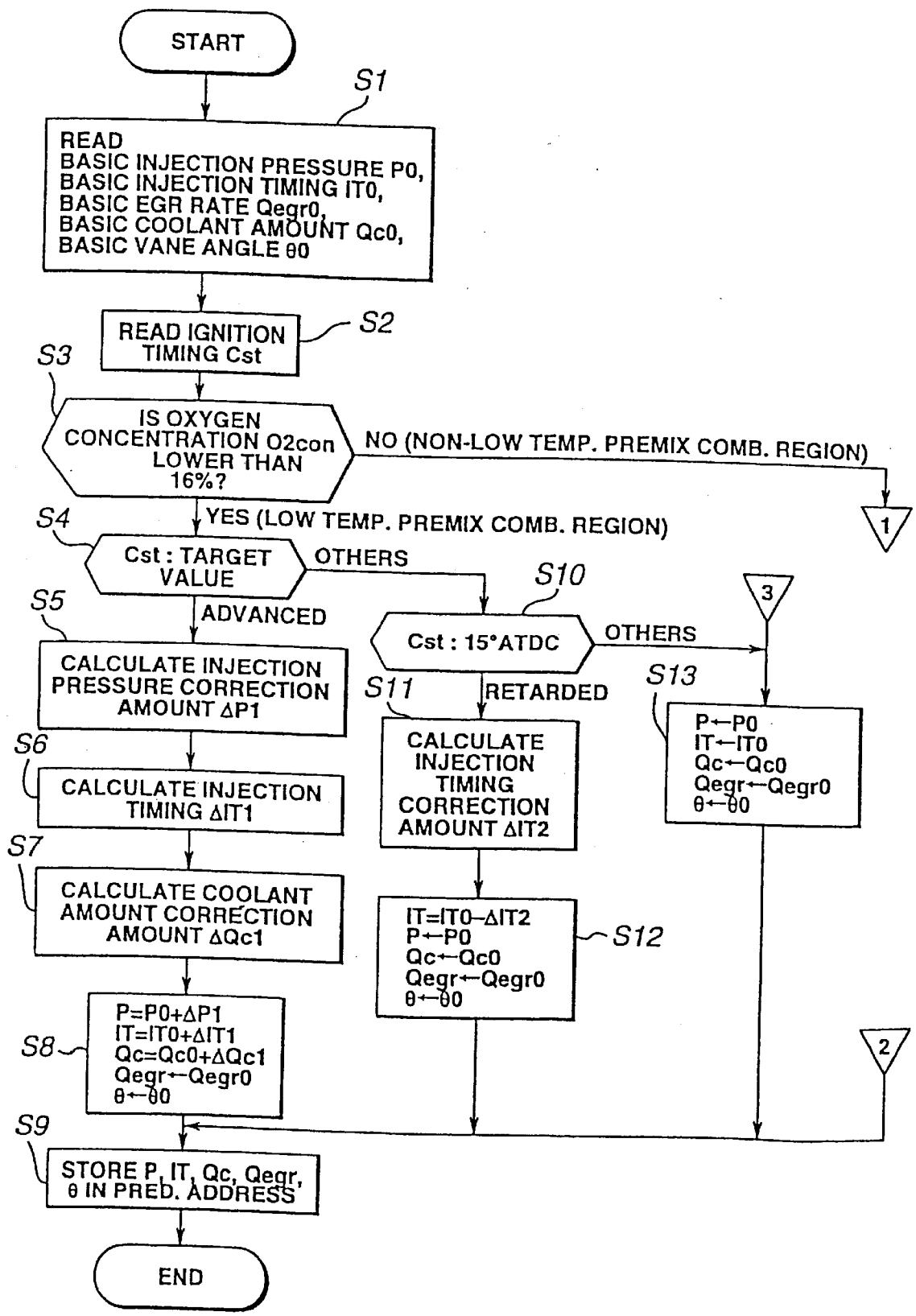
FIG. 7 is a part of a flowchart of the control according to the combustion control system of FIG. 1.
Figure 8:
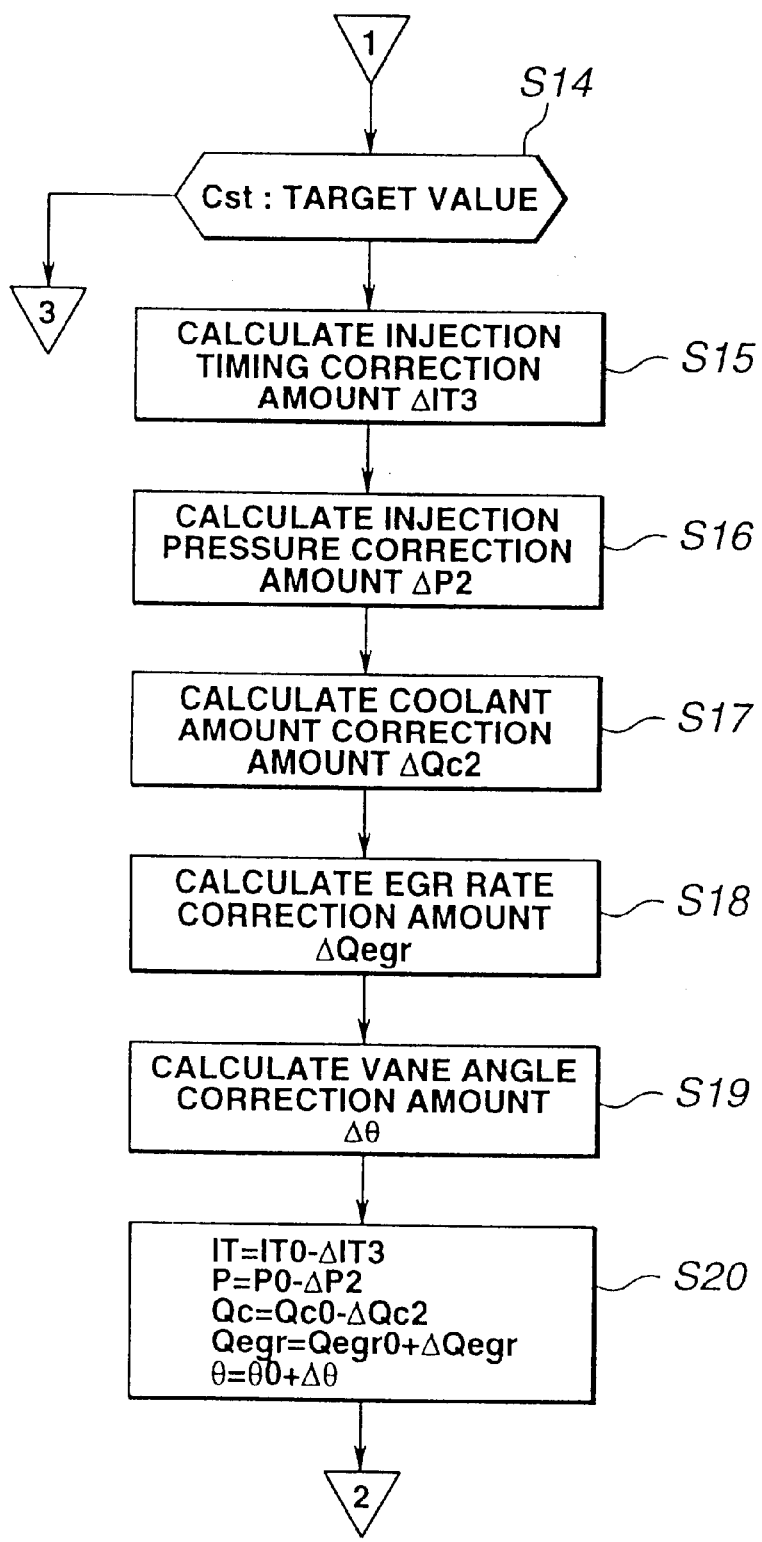
FIG. 8 is another part of the flowchart of the control according to the combustion control system of FIG. 1.

Next, control for attaining the effects of FIGS. 5 and 6 will be discussed in detail with reference to flowcharts of FIGS. 7 and 8. A control routine in FIGS. 7 and 8 is executed every a predetermined time.

At a step S1, a basic fuel injection pressure P0, a basic fuel injection initiation timing IT0 (corresponding to the fuel injection timing in FIG. 4), a basic EGR rate Qegr0 (corresponding to EGR rate in FIG. 3), a basic amount Qc0 of engine coolant flowing through the EGR gas cooling device 7, and a basic vane angle θ0 of the vane 53 of the turbocharger T are read. These basic values (P0, IT0, Qegr0, Qc0, θ0) are calculated upon searching maps or tables.

At a step S2, the actual ignition timing Cst is read. Here, the actual ignition timing Cst is detected by a known method which is, for example, carried out as follows: A pressure inside the cylinder of the engine rapidly rises upon ignition of fuel. This pressure rise is detected by a pressure sensor including an piezoelectric element. The pressure sensor serves as an ignition timing sensor 37 as shown in FIG. 1. The ignition timing is detected as a timing at which a differentiated value of the pressure detected by the sensor 37 has reached a predetermined value or higher.

At a step S3, comparison is made between the actual oxygen concentration O2con and a predetermined value (for example, 16%). Here, the predetermined value (16%) is the oxygen concentration at which the low temperature premix combustion is mainly made. Accordingly, it is judged that engine operation is in the low temperature premix combustion region in case that the actual oxygen concentration O2con is lower than 16%, and in the non-low temperature premix combustion region in case that the actual oxygen concentration O2con exceeds 16%. The actual oxygen concentration O2con can be determined by using detected values of an air-fuel ratio sensor (or oxygen sensor) 38 and an airflow meter 39. The air-fuel ratio sensor 38 and the airflow meter 39 are respectively disposed in the exhaust gas passageway 2 and the intake air passageway 3 as shown in FIG. 1. It will be understood that the predetermined value (16%) of the oxygen concentration is different depending on engines.

Figure 9:
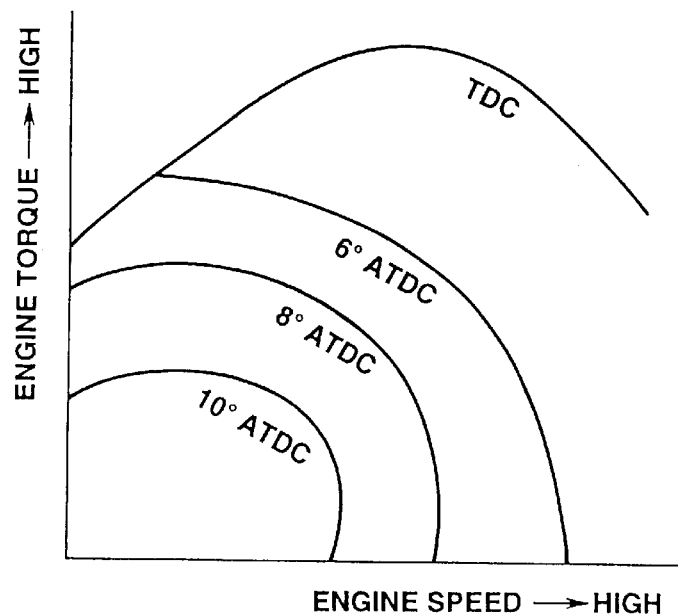
FIG. 9 is a graph showing a target value of the ignition timing in terms of engine torque and engine speed, used in the combustion control system of FIG. 1.

When engine operation is in the low temperature premix combustion region, a flow goes to a step S4 in which comparison is made between the ignition timing Cst and a target value of the ignition timing. Here, the ignition timing target value in the low temperature premix combustion region is the same as or retarded (in crank angle) relative to the fuel injection termination timing. In concrete, the ignition timing target value has been previously set in accordance with engine speed and engine torque (load) as shown in FIG. 9, so that the target value may be determined by, for example, searching a predetermined map in accordance with engine speed and engine torque.

When the ignition timing Cst is advanced relative to the target value, the flow goes to steps S5, S6, S7 where calculations are made to obtain a correction amount $\Delta$P1 for raising the fuel injection pressure, a correction amount $\Delta$IT1 for retarding the fuel injection initiation timing, and a correction amount $\Delta$ Qc1 for increasing the engine coolant amount flowing through the EGR gas cooling device. At a step S8, these correction amounts are added to the corresponding basic values P0, IT0, Qc0 thereby making correction to obtain the fuel injection pressure P, the fuel injection initiation timing IT, and the engine coolant amount Qc. Concerning the EGR rate Qegr and the vane angle $\theta$ which are unnecessary to be corrected, their basic values Qegr0 and the vane angle $\theta$0 are used as they are without being corrected. At a step S9, the above values P, IT, Qc, Qegr and $\theta$ are stored in a predetermined address thus completing the processing of this routine.

Concerning the calculation formula for the fuel injection initiation timing IT at the step S8, a standard position for fuel injection timing control is, for example, at a crank angle position which is considerably advanced relative to the most advanced value of the calculated values of the fuel injection initiation timing. Accordingly, the value of the fuel injection initiation timing is retarded relative to the above standard position, so that "+" in front of the $\Delta$IT1 in the calculation formula means a retardation in crank angle.

Figure 10:
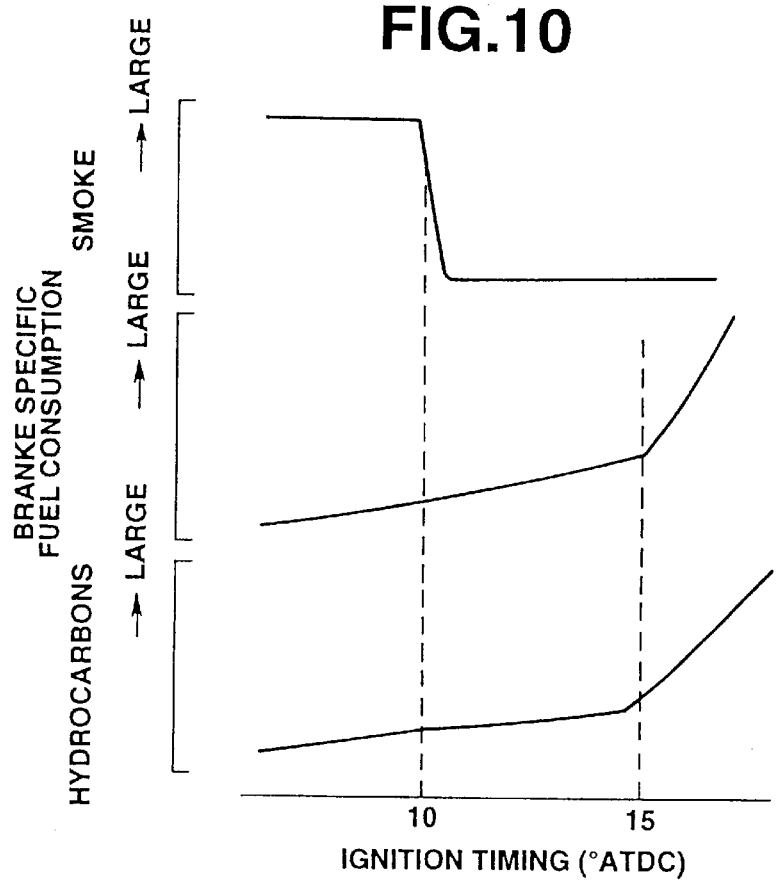
FIG. 10 is a graph showing the reason for setting a retarded limit for the ignition timing of the engine.

When the actual ignition timing Cst is not advanced relative to the target value, the flow goes from the step S4 to a step S10 where comparison is made between the actual ignition timing Cst and a predetermined crank angle (for example, 15 degrees after top dead center on compression stroke). In order to accomplish the low temperature premix combustion, it is preferable to make ignition at the ignition timing retarded relative to the fuel injection termination timing; however, there is a limit for retarding the ignition timing. In this regard, if combustion is initiated at the ignition timing which is excessively retarded, combustion pressure is lowered thereby degrading fuel consumption while combustion temperature is lowered thereby increasing unburned component emission. Accordingly, the limit over which a combustion initiation timing (ignition timing) must not be retarded is set at 15 degrees after top dead center (on compression stroke) as seen from FIG. 10. Preferably, the limit is set at 15 degrees ATDC (after top dead center) ±5 degrees. While the limit has been described to be set at 15 degrees after top dead center on compression stroke in this case, it will be understood that this limit may be different depending upon engines.

When the ignition timing Cst is retarded relative to 15 degrees after top dead center on compression stroke, the flow goes to a step S11 where a correction amount $\Delta$IT2 for advancing the fuel injection initiation timing is calculated. At a step S12, the correction amount $\Delta$IT2 is subtracted from the basic value IT0 thereby to obtain the fuel injection initiation timing IT. Concerning the fuel injection pressure P, the engine coolant amount Qc, the EGR rate Qegr and the vane angle $\theta$ which are unnecessary to be corrected, their basic values P0, Qc0, Qegr0 and $\theta$0 are used as they are without being corrected. Thereafter, the flow goes to the step S9 in which the above values IT, P, Qc, Qegr and $\theta$ are stored in the predetermined address thus completing the processing of this routine.

When the ignition timing Cst is not retarded relative to 15 degrees after top dead center on compression stroke (i.e., the actual ignition timing Cst coincides with the target value), the flow goes from step S10 to a step S13 where the basic values P, IT, Qegr, Qc and $\theta$ are respectively applied to the fuel injection pressure P, the fuel injection initiation timing IT, the EGR rate Qegr, the engine coolant amount Qc and the vane angle $\theta$. Thereafter, the flow goes to the step S9 where the above values P, IT, Qc, Qegr and $\theta$ are stored in the predetermined address thus completing the processing of this routine.

When engine operation is in the non-low temperature premix combustion region, the flow goes from the step S3 in FIG. 7 to a step S14 in FIG. 8, in which comparison is made between the ignition timing Cst and the target value. The target value of the ignition timing in the non-low temperature premix combustion region is not necessarily the same as that in the low temperature premix combustion region. For example, in case of FIG. 6, the ignition timing target value is positioned at a plus value in value (the fuel injection period—the ignition delay period), which means that the ignition timing is advanced relative to the fuel injection termination timing. This is because the ignition timing is controlled upon taking account of combustion noise in the non-low temperature premix combustion.

When the ignition timing is retarded relative to the target value, the flow goes from the step S14 to steps 15, 16, 17, 18, and 19 where calculations are made to obtain a correction amount $\Delta$IT3 for advancing the fuel injection initiation timing, a correction amount $\Delta$P2 for lowering the fuel injection pressure, and a correction amount $\Delta$Qc2 for decreasing the engine coolant amount flowing through the EGR gas cooling device, a correction amount $\Delta$Qegr for increasing the EGR rate, and a vane angle correction amount $\Delta\theta$ for increasing the supercharged pressure. Thereafter, the flow goes to a step S20 where the correction amounts $\Delta$IT3, $\Delta$P2, $\Delta$Qc2 are respectively subtracted from the basic values thereby making correction to obtain the corrected values of the fuel injection timing IT, the fuel injection pressure P and the engine coolant amount Qc. Additionally, the correction amounts $\Delta$Qegr, $\Delta\theta$ are respectively added to the basic values thereby making correction to obtain the EGR rate Qegr and the vane angle $\theta$. In the calculation formula for the vane angle at the step S20, the supercharged pressure increases as the calculated value of the vane angle increases.

FIGS. 11A to 13 illustrate a second embodiment of the combustion control system S according to the present invention, which is similar to the first embodiment combustion control system of FIGS. 1 to 10. It will be understood that the second embodiment combustion control system S is the same in structural configuration as the combustion control system shown in FIGS. 1 and 2. While the first embodiment has been shown and described as being configured to be capable of restore the relationship between the fuel injection period and the ignition delay period to the target state, the second embodiment is configured to deal with such a difficulty that the relationship between the fuel injection period and the ignition delay period cannot be restored to the target state in the non-premix combustion region, owing to an excessive prolongation of the ignition delay period, for example, due to a low cetane number of fuel.

As discussed above, in the first embodiment, correction for restoring the relationship between the fuel injection period and the ignition delay period to the target state is accomplished as shown in FIG. 6.

However, according to this embodiment, in case that correction of the ignition delay period is impossible, the following operations are carried out:

(a) First, the EGR rate is increased to lower the oxygen concentration. This is an operation for shifting combustion into the low temperature premix combustion; and (b) The above operation (a) not only has changed the oxygen concentration but also has increased the temperature of intake air under the action of a large amount of high EGR gas thereby to shorten the ignition delay period. In order to avoid this shortcoming, a closing timing of each intake valve 60 (shown in FIG. 13) of the engine E is retarded to lower an actual compression ratio (i.e., lowering the temperature at the terminal period on compression stroke) thereby prolonging the ignition delay period.

Figure 11A:
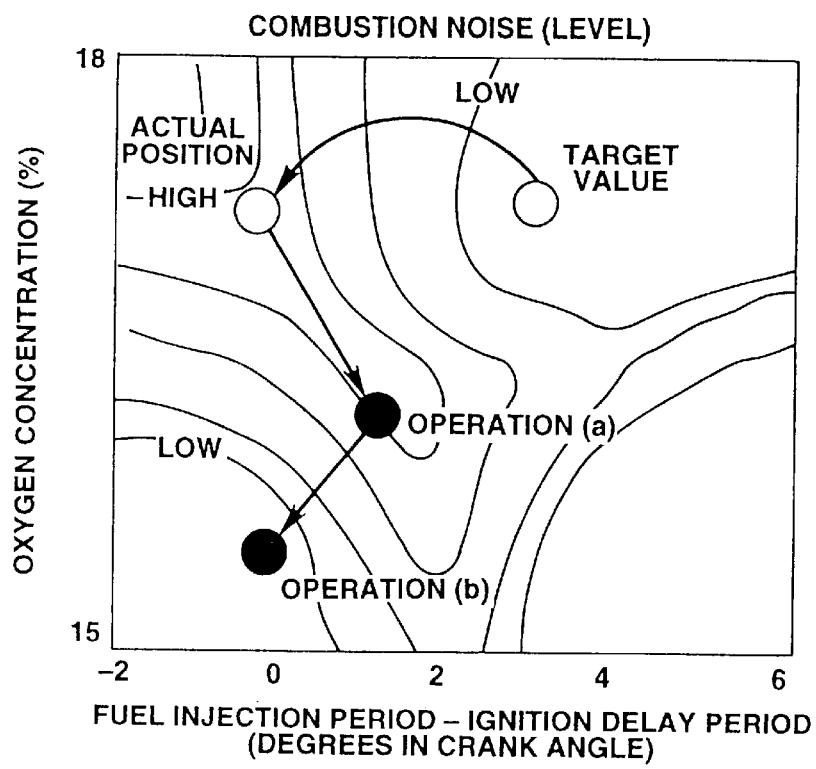
FIG. 11A is a map illustrating a control manner (for combustion noise) in case that the ignition delay period is prolonged owing to low cetane number of fuel in a non-low temperature premix combustion region, in connection with a second embodiment of the combustion control system according to the present invention.
Figure 11B:
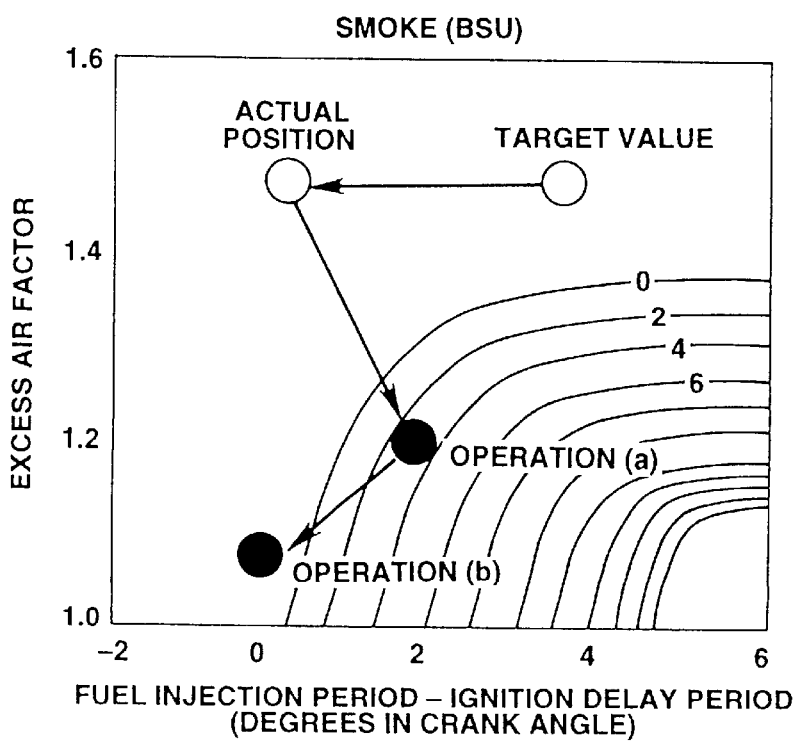
FIG. 11B is a map similar to FIG. 11A but illustrating a control manner (for smoke) in connection with the second embodiment of the combustion system according to the present invention.

With the above two operations (a) and (b), the control point can shift to a position (where combustion noise level is low) generally equal to the target value as shown in FIG. 11A, thus effectively suppressing combustion noise even in case that the correction of the ignition delay period is impossible. Additionally, by retarding the closing timing of each intake valve, intake air is discharged at the first half of compression stroke through the intake valve, and therefore an oxygen amount is decreased while the oxygen concentration is the same so that the excess air factor is lowered. As a result, combustion falls in the premix combustion region thereby preventing smoke from increasing in exhaust gas, as shown in FIG. 11B.

Thus, according to the second embodiment, in case that the relationship between the fuel injection period and the ignition delay period is difficult to be restored to the target state in the non-low temperature premix combustion owing to the excessive prolongation of the ignition delay period, for example, due to use of a low cetane number fuel, the oxygen concentration is further lowered to cause combustion to shift to the low temperature premix combustion while the closing timing of each intake valve is retarded to lower the temperature at the terminal period of compression stroke. This can prevent smoke in exhaust gas from increasing while lowering combustion noise of the engine.

Even in case that the ignition delay period is largely prolonged owing to a low cetane number fuel, prolongation of the ignition delay period is preferable in the low temperature premix combustion region having the oxygen concentration of not higher than 16% as discussed in connection with the first embodiment, so that it is sufficient only to advance the fuel injection timing so as to cause the ignition timing to coincide with the target value.

Figure 12:
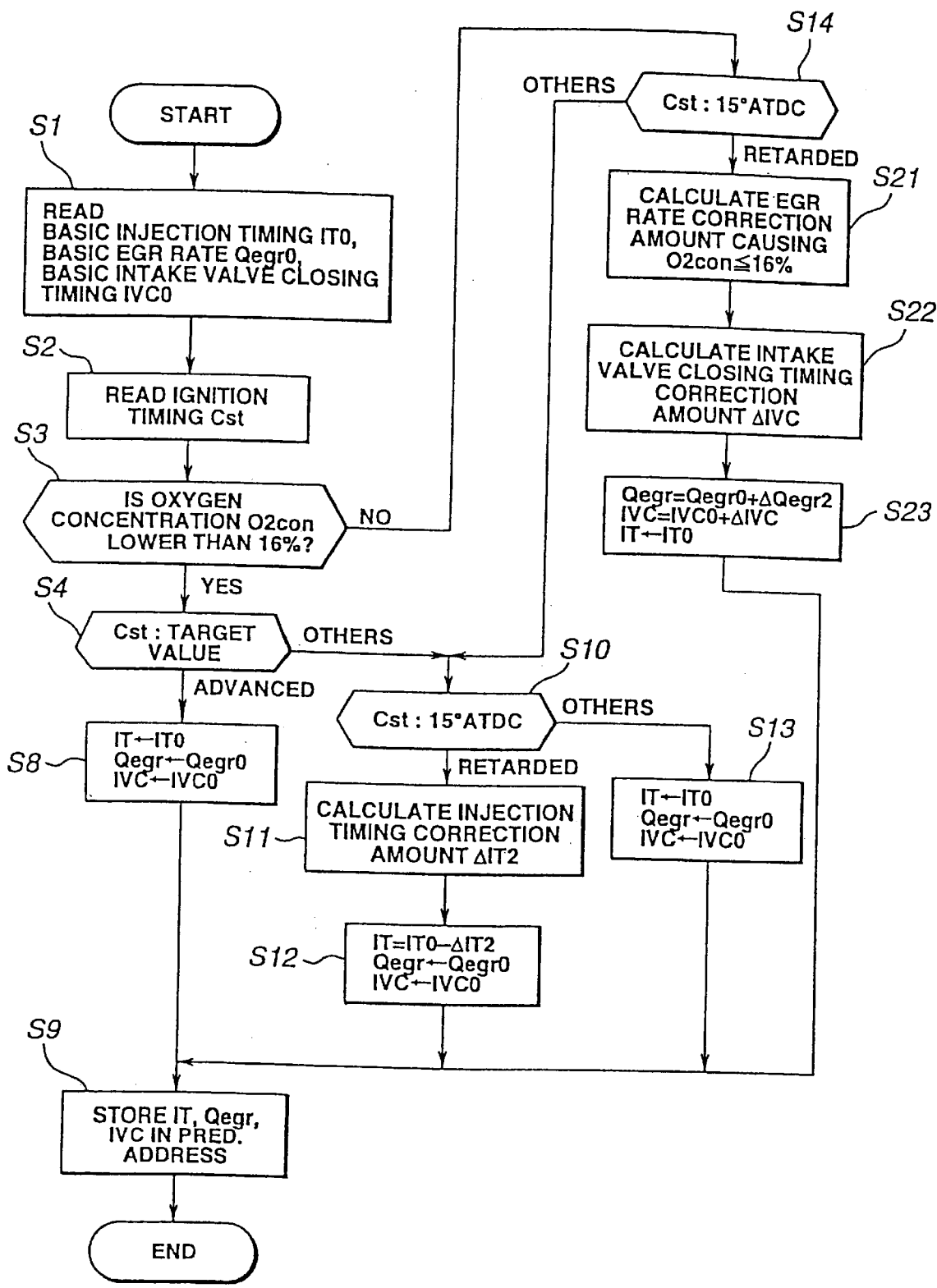
FIG. 12 is a flowchart of the control accomplished according to the second embodiment combustion control system.
Figure 13:
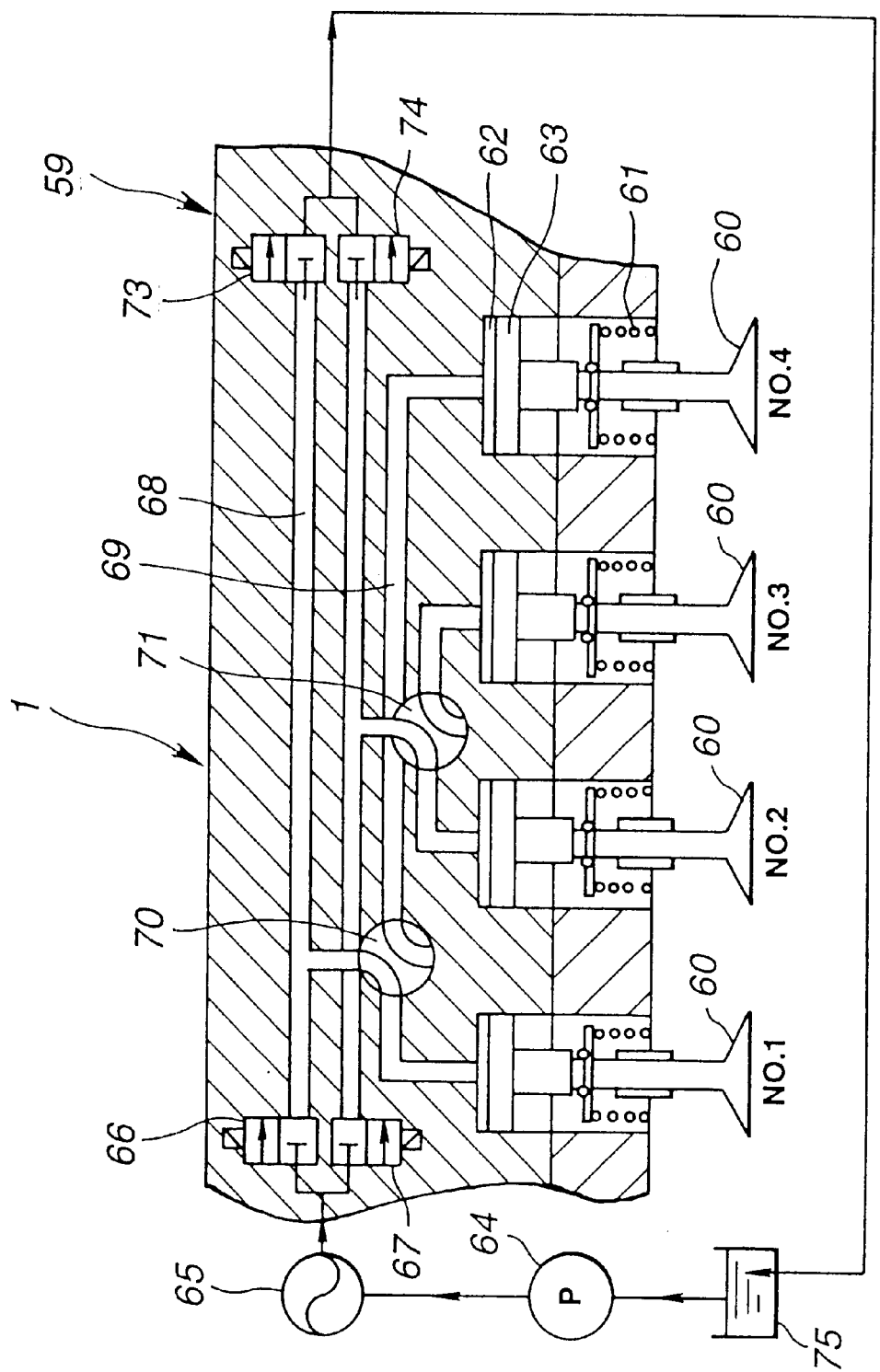
FIG. 13 is a fragmentary sectional view of an essential part of a fuel injection system used in the second embodiment combustion control system.
Figure 14:
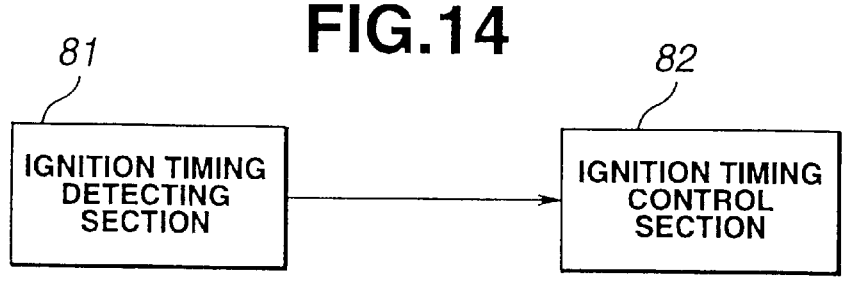
FIG. 14 is a block diagram showing the principle of the second aspect of the present invention.
Figure 15:
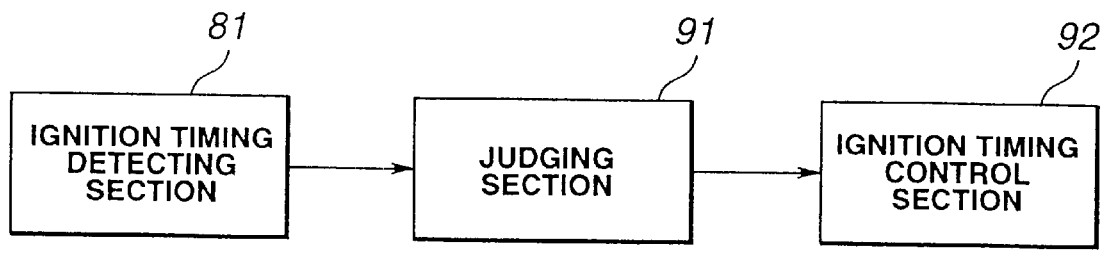
FIG. 15 is a block diagram showing the principle of the third aspect of the present invention.
Figure 16:
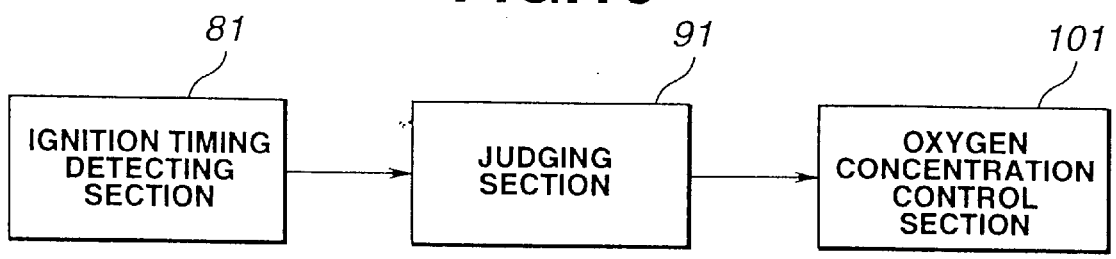
FIG. 16 is a block diagram showing the principle of the fourth aspect of the present invention.
Figure 17:
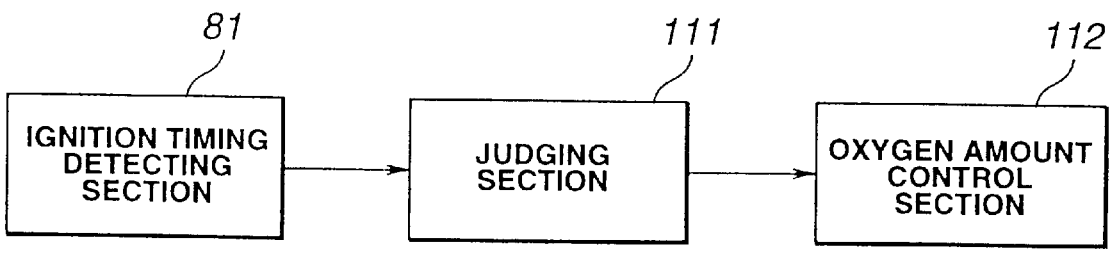
FIG. 17 is a block diagram showing the principle of the fifth aspect of the present invention.
Figure 2:
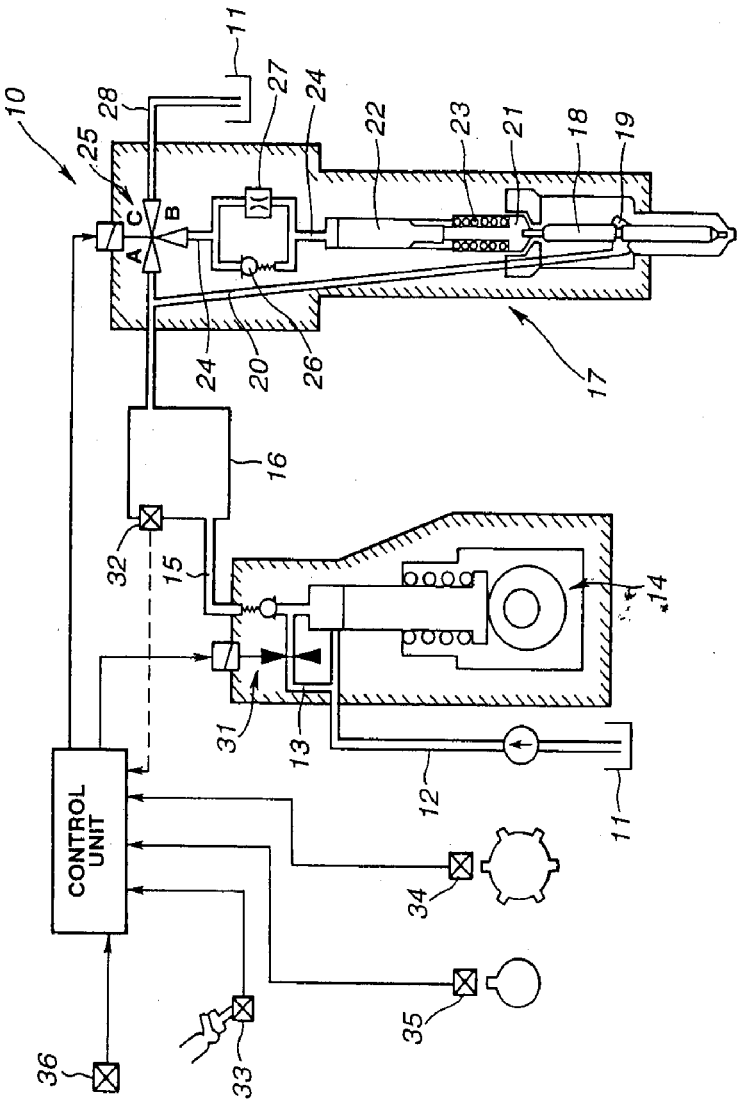

Control for attaining the effects of FIGS. 11A and 11B will be discussed in detail with reference to a flowchart of FIG. 12. A control routine in FIG. 12 is executed every a predetermined time. The control of the flowchart in FIG. 12 is similar to that of the first embodiment in FIGS. 7 and 8, so that the same step numbers are assigned respectively to the similar steps to those in FIGS. 7 and 8. It will be understood that objects to be corrected are the fuel injection initiation timing, the EGR rate and the closing timing of each intake valve in the second embodiment, in which the values (the fuel injection pressure, the engine coolant amount and the vane angle) which are not necessary to be corrected are omitted. Additionally, in the second embodiment, only the case that the ignition delay period is prolonged owing to low cetane number fuel or the like is dealt with to be controlled, a case that the ignition delay period is shortened will not be discussed.

Discussion is mainly made on parts different from the first embodiment, with reference to the flowchart of FIG. 12.

When the relationship between the actual oxygen concentration O2con and the predetermined value of 16% is O2con>16% (the non-low temperature premix combustion region) while the ignition timing Cst is retarded relative to the target value, the flow goes through the steps 3, 4 and 14 to steps 21 and 22 where calculations are made to obtain an EGR rate correction amount $\Delta Qegr2$ for causing actual oxygen concentration to be not higher than 16% and a correction amount $\Delta IVC$ for retarding the closing timing of the intake valve. At a step S23, these correction amounts $\Delta Qegr2$, $\Delta IVC$ are added respectively to the basic values Qegr0 and IVC0 thereby making correction to obtain the EGR rate Qegr and the closing timing IVC of the intake valve. For the fuel injection initiation timing IT which is not necessary to be corrected, the basic value is applied as it is.

Concerning the calculation formula for the closing timing of the intake valve, similarly to the fuel injection initiation timing, a standard position for intake valve closing timing control is, for example, at a crank angle position which is considerably advanced relative to the most advanced value of the calculated values of the intake valve closing timing. Accordingly, the value of the intake valve closing timing is retarded relative to the above standard position, so that "+"in front of the $\Delta IVC$ in the calculation formula means a retardation in crank angle.

In order to control the closing timing of each intake valve, a known variable valve timing mechanism may be used. An example of such a known mechanism is disclosed in Japanese Patent Provisional Publication No. 8-254134 and shown in FIG. 13. Brief discussion will be made on the variable valve timing mechanism 59 with reference to FIG. 13. The engine main body 1 of the diesel engine E has the intake valves 60 which are biased in a direction to be closed under the action of valve springs 61.

The variable valve timing mechanism 59 includes pistons 63 which are connected respectively to the upper ends of the intake valves 60. Each piston 63 defines a hydraulic chamber 62 which is to be supplied with hydraulic pressure. The piston 63 can descend against the bias of the valve spring 61 under the action of hydraulic pressure introduced into the hydraulic chamber 62.

Hydraulic fluid discharged from an oil pump 64 is selectively supplied from an accumulator 65 into oil passages 68, 69 through inlet-side electromagnetic change-over valves 66, 67. The hydraulic fluid supplied to the oil passage 68, 69 is selectively supplied to the hydraulic chambers 62, 62 for Nos. 1 and 4 cylinders of the engine through a rotary valve 70, and to the hydraulic chambers 62, 62 for Nos. 2 and 3 cylinders of the engine through a rotary valve 71. Consequently, the intake valve 60 for the No. 1 cylinder, the intake valve 60 for the No. 4 cylinder, the intake valve 60 for the No. 2 cylinder and the intake valve 60 for the No. 3 cylinder are successively opened. Each rotary valve 70, 71 is rotatable in timed relation to engine speed of the engine.

The hydraulic fluid in each hydraulic chamber 62 is selectively discharged from the oil passage 68, 69 through one of outlet-side electromagnetic change-over valves 73, 74 to a tank 75, so that the intake valves 60 are successively closed. The closing timing of each intake valve 60 is variably regulated by controlling the outlet-side electromagnetic change-over valves 73, 74. Accordingly, in case of using the variable valve timing mechanism 59 (shown in FIG. 13) in the combustion control system S of the present invention, the outlet-side electromagnetic change-over valves 73, 74 are controlled in accordance with the values of the intake valve closing timing IVC obtained upon execution of the flow in FIG. 12.

Experiments have revealed that there exists a case in which it is difficult to control the ignition timing Cst to coincide with or retarded relative to the fuel injection termination timing under a condition where the actual ignition timing Cst is advanced relative to the fuel injection termination timing in the low temperature premix combustion, though not discussed. In such a case, a control for increasing the oxygen amount in the combustion chamber is made (for example, by increasing the supercharged pressure by the turbocharger or by decreasing the EGR rate), giving up carrying out the low temperature premix combustion. This shits combustion into normal combustion whose major part is diffusive combustion, thereby decreasing smoke in exhaust gas.

While the embodiments of the present invention have been shown and described as being arranged such that the low temperature premix combustion is carried out, it will be understood that the principle of the present invention may be applied to diesel engines in which no low temperature premix combustion is made.

Although the oxygen amount or concentration in the combustion chamber has been shown and described as being changed by the EGR rate in the combustion control systems of the embodiments, it will be appreciated that the principle of the present invention may be applied to other combustion control systems for diesel engines, such as those configured such that the oxygen amount is changed, for example, by using an oxygen permeable membrane.

What is claimed is:

1. A combustion control system for a diesel engine, comprising:

a section for detecting an ignition timing;

a section for judging that the detected ignition timing is retarded relative to a target value; and a section for controlling the detected ignition timing to approach a fuel injection termination timing when the detected ignition timing is retarded relative to the target value, the controlling section including a section for accomplishing at least one of a first operation of advancing a fuel injection initiation timing, a second operation of decreasing a fuel injection rate, a third operation of raising a temperature at a terminal period of compression stroke, and a fourth operation of increasing an EGR rate.

2. A combustion control system as claimed in claim 1, wherein the controlling section accomplishes at least one of the third and fourth operations, and the controlling section includes a section for accomplishing a fifth operation of increasing a supercharged pressure in accordance with decreased amounts of an oxygen concentration and an excess air factor in a combustion chamber, the decreased amounts owed to the accomplished at least one of the third and fourth operations.

3. A combustion control system as claimed in claim 1, wherein the second operation is accomplished by decreasing a fuel injection pressure.

4. A combustion control system as claimed in claim 2, wherein the second operation is accomplished by decreasing a fuel injection pressure.

5. A combustion control system as claimed in claim 1, wherein the third operation is accomplished by at least one of a fifth operation of decreasing a degree of cooling for EGR gas, and a sixth operation of advancing a closing timing of an intake valve.

6. A combustion control system as claimed in claim 2, wherein the third operation is accomplished by at least one of a fifth operation of decreasing a degree of cooling for EGR gas, and a sixth operation of advancing a closing timing of an intake valve.

\* \* \* \* \*

UNITED STATES PATENT AND TRADEMARK OFFICE
CERTIFICATE OF CORRECTION

PATENT NO. : 6,606,979 B2
DATED : August 19, 2003
INVENTOR(S) : Shuji Kimura

It is certified that error appears in the above-identified patent and that said Letters Patent is hereby corrected as shown below:

Drawings,
Replace Figures 1 through 17 with the attached formal drawings.

Signed and Sealed this

Twelfth Day of October, 2004

JON W. DUDAS
*Director of the United States Patent and Trademark Office*

(12) United States Patent
Kimura

(10) Patent No.: US 6,606,979 B2
(45) Date of Patent: Aug. 19, 2003

(54) COMBUSTION CONTROL SYSTEM FOR DIESEL ENGINE

(75) Inventor: Shuji Kimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/933,681

(22) Filed: Aug. 22, 2001

(65) Prior Publication Data

US 2002/0011240 A1 Jan. 31, 2002

Related U.S. Application Data

(62) Division of application No. 09/163,355, filed on Sep. 30, 1998, now Pat. No. 6,283,096.

(30) Foreign Application Priority Data

Sep. 30, 1997 (JP) .................................. 9-266358

(51) Int. Cl.[7] ............................................. F02M 37/04
(52) U.S. Cl. ......................................... 123/500; 123/305
(58) Field of Search ................... 123/501, 305, 123/357, 500, 502, 496, 295, 568.11

(56) References Cited

U.S. PATENT DOCUMENTS

| | | | |
|---|---|---|---|
| 4,397,285 A | | 8/1983 | O'Neill ...................... 123/502 |
| 4,503,830 A | * | 3/1985 | Nakamura et al. ........... 123/501 |
| 4,572,119 A | * | 2/1986 | Ikeda ...................... 123/145 A |
| 4,624,229 A | * | 11/1986 | Matekunas .................. 123/425 |
| 4,671,236 A | | 6/1987 | Matsumura et al. ........ 123/357 |
| 4,722,310 A | * | 2/1988 | Igashira et al. ............. 123/300 |
| 4,763,630 A | | 8/1988 | Nagase et al. ............... 123/501 |
| 4,883,032 A | * | 11/1989 | Hunter et al. ............... 123/256 |
| 5,522,359 A | | 6/1996 | Collin ....................... 123/305 |
| 5,577,476 A | * | 11/1996 | Iyoda ........................ 123/425 |
| 5,626,115 A | * | 5/1997 | Kawaguchi ................. 123/305 |
| 5,682,856 A | * | 11/1997 | Tomisawa et al. .......... 123/425 |
| 5,692,464 A | | 12/1997 | Kimura ................... 123/90.15 |
| 5,743,243 A | * | 4/1998 | Yanagihara ................. 123/305 |
| 5,778,857 A | * | 7/1998 | Nakamura et al. ..... 123/406.37 |
| 5,823,168 A | | 10/1998 | Otoh et al. ................. 123/496 |
| 6,062,185 A | * | 5/2000 | Chiu et al. .............. 123/145 A |

FOREIGN PATENT DOCUMENTS

| | | |
|---|---|---|
| DE | 43 33 424 | 4/1994 |
| DE | 195 34 770 | 3/1996 |
| EP | 0 641 926 | 3/1995 |
| JP | 8-086251 | 4/1996 |
| JP | 8-254134 | 10/1996 |

OTHER PUBLICATIONS

Ito et al., "Injection Rate Shaping Technology with Common Rail Fuel System (ECD–U2)", The 13th Internal Combustion Engine Symposium Lecture Papers, (1996), pp. 73–77.

* cited by examiner

Primary Examiner—Carl S. Miller
(74) Attorney, Agent, or Firm—Foley & Lardner

(57) ABSTRACT

A combustion control system for a diesel engine provided with a fuel injection system and a sensor for detecting an ignition timing. The combustion control system comprises a control unit which is configured to control the ignition timing to be restored to a target value when the ignition timing shifts from the target value owing to circumferential factors such as cetane number of fuel. Preferably, the ignition timing is controlled to generally coincide with or be retarded relative to a fuel injection termination timing. This regulates an ignition delay period to be longer than a fuel injection period in a predetermined engine operating region, thereby effectively accomplishing so-called low temperature premix combustion.

6 Claims, 11 Drawing Sheets

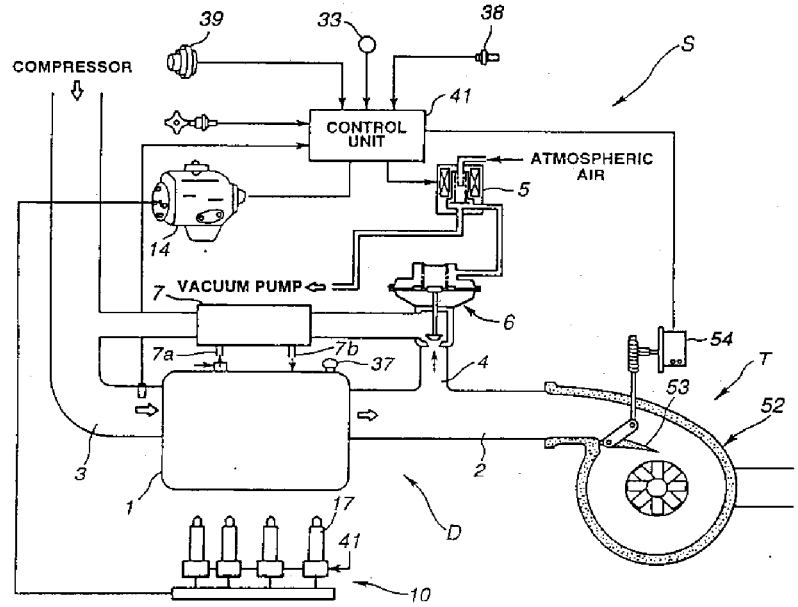

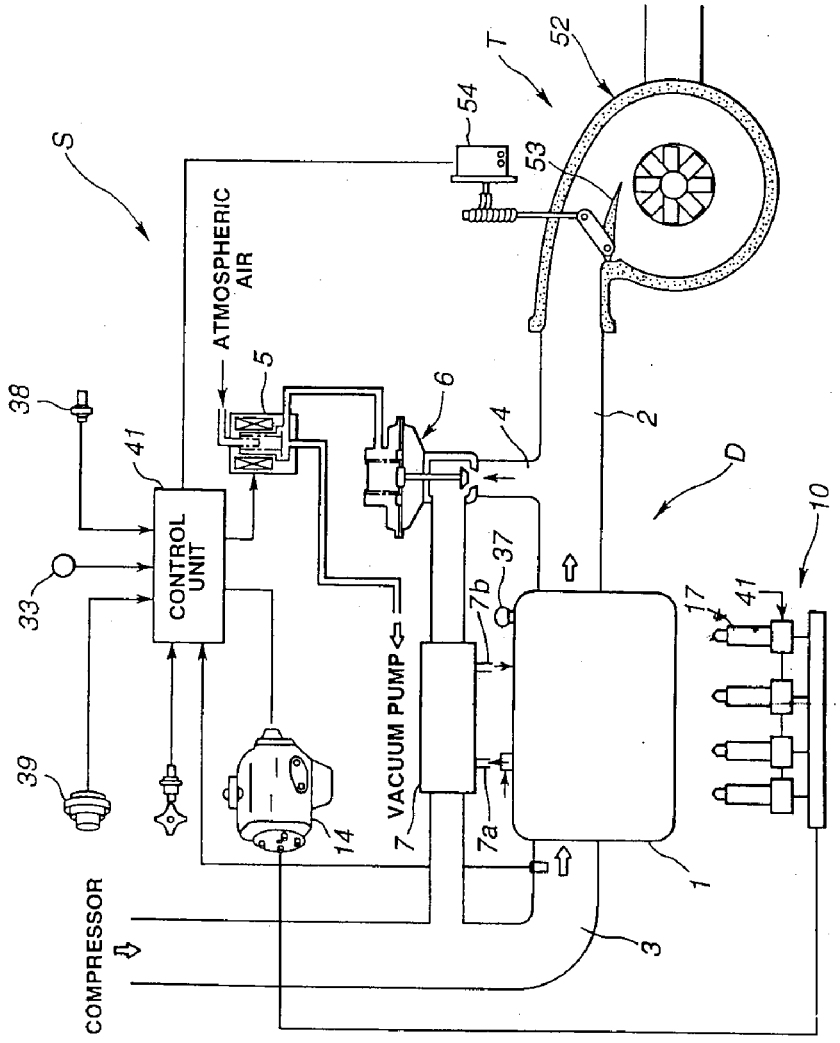

IGNITION TIMING TARGET VALUE